US012699045B2

(12) United States Patent
Okamoto et al.

(10) Patent No.: US 12,699,045 B2
(45) Date of Patent: Aug. 4, 2026

(54) INTEGRATED-OPTIC FOURIER TRANSFORM SPECTROMETER USING TWIN WAVEGUIDE ARRAYS

(71) Applicant: Intelligent Fiber Optic Systems Corporation, San Jose, CA (US)

(72) Inventors: Katsunari Okamoto, Mito (JP); Behzad Moslehi, Los Altos, CA (US); Mehrdad M. Moslehi, Los Altos, CA (US)

(73) Assignee: Intelligent Fiber Optic Systems Corporation, Fremont, CA (US)

( * ) Notice: Subject to any disclaimer, the term of this patent is extended or adjusted under 35 U.S.C. 154(b) by 471 days.

(21) Appl. No.: 18/119,279

(22) Filed: Mar. 8, 2023

(65) Prior Publication Data

US 2023/0333008 A1       Oct. 19, 2023

Related U.S. Application Data

(60) Provisional application No. 63/352,581, filed on Jun. 15, 2022, provisional application No. 63/317,913, filed on Mar. 8, 2022.

(51) Int. Cl.
G01N 21/31           (2006.01)

(52) U.S. Cl.
CPC ................................... G01N 21/31 (2013.01)

(58) Field of Classification Search
CPC ...... G01N 21/31; G01J 3/0218; G01J 3/4532; G01J 3/4531; G02B 6/12011; G02B 6/12016
See application file for complete search history.

(56) References Cited

U.S. PATENT DOCUMENTS

| 2004/0218855 A1* | 11/2004 | Markwardt | H04J 14/0221 |
| | | | 385/24 |
| 2010/0110443 A1* | 5/2010 | Cheben | G02B 6/4215 |
| | | | 356/454 |
| 2012/0050744 A1* | 3/2012 | Takada | G01J 3/4532 |
| | | | 356/451 |
| 2017/0248405 A9* | 8/2017 | Jiang | G01B 9/02083 |
| 2018/0196197 A1* | 7/2018 | Sodagar | G02B 6/1228 |
| 2019/0324201 A1* | 10/2019 | Celo | G02B 6/122 |
| 2020/0397301 A1* | 12/2020 | Lychagov | G01J 3/0272 |
| 2023/0046152 A1* | 2/2023 | Grote | G02B 6/29349 |

* cited by examiner

Primary Examiner — Tarifur R Chowdhury
Assistant Examiner — Akbar H. Rizvi
(74) Attorney, Agent, or Firm — John Ryan C. Wood; Wood Patent Law

(57)           ABSTRACT

A Fourier transform spectrometer implemented on a photonic integrated circuit (PIC) is provided. An input optical signal waveguide carries an input optical signal to be analyzed to an on-chip Y branch splitter to split the input signal equally to carry coupled-optical signals related to the input optical signal into twin array waveguides of a first waveguide array and a second waveguide array. The optical signal from the first waveguide array and the optical signal from the second waveguide array intersect at a preset intersecting angle at an output plane of the PIC such that the spectral and spatial resolutions of the interferogram of the spectrometer are determined by the intersecting angle.

20 Claims, 31 Drawing Sheets

$$\Delta T_{m=3} = \frac{3}{2M_{TO}} \Delta T_{max} \quad \Rightarrow \quad \Omega_3 = 3\pi$$

$$\Delta T_{m=8} = \frac{8}{2M_{TO}} \Delta T_{max} \quad \Rightarrow \quad \Omega_8 = 8\pi$$

$$\Delta T_{m=4} = \frac{4}{2M_{TO}} \Delta T_{max} \implies \Omega_4 = 4\pi$$

$$\Delta T_{m=9} = \frac{9}{2M_{TO}} \Delta T_{max} \implies \Omega_9 = 9\pi$$

$$\Delta T_{m=5} = \frac{5}{2M_{TO}} \Delta T_{max} \implies \Omega_5 = 5\pi$$

$$\Delta T_{m=10} = \Delta T_{max} \implies \Omega_{10} = 10\pi$$

Redundant (Unnecessary)

INTEGRATED-OPTIC FOURIER TRANSFORM SPECTROMETER USING TWIN WAVEGUIDE ARRAYS

CROSS-REFERENCE TO RELATED APPLICATIONS

This application claims the benefit of U.S. Provisional Patent Application Ser. Nos. 63/317,913 filed Mar. 8, 2022 and 63/352,581 filed Jun. 15, 2022, which are hereby incorporated by reference in their entirety.

FIELD

This disclosure relates generally to transform spectrometers. More specifically, this disclosure is related to Fourier transform spectrometers.

BACKGROUND

The present application provides transform spectrometer solutions which are particularly described with reference to addressing problems, challenges, and shortcomings relating to Stationary-Wave Integrated Fourier-Transform Spectrometry (SWIFT'S) technology.

Relating to SWIFTS, in approximately 2004 two French researchers, Etienne Le Coarer from Joseph Fourier University and Pierre Benech from INP Grenoble, coupled sensing elements to the "evanescent" part of "standing waves" within a single-mode waveguide. In approximately 2007, those two researchers reported a "near-field" method to probe the interferogram within a waveguide and the first SWIFTS-based spectrometers appeared in approximately 2011 based on a SWIFTS linear configuration. Generally, the technology works by probing an optical standing wave, or the sum of the standing waves in the case of polychromatic light, created by a light to be analyzed.

In physics, a standing wave, also known as a stationary wave, is a wave that oscillates in time but whose peak amplitude profile does not move in space. The peak amplitude of the wave oscillations at any point in space is constant with respect to time, and the oscillations at different points throughout the wave are in phase. The locations at which the absolute value of the amplitude is minimum are called nodes, and the locations where the absolute value of the amplitude is maximum are called antinodes. Standing waves were first described scientifically by Michael Faraday in 1831.

In a SWIFTS linear configuration (i.e., a true Lippman configuration), the stationary wave is created by a single-mode waveguide ended by a fixed mirror. The stationary wave is regularly sampled on one side of a waveguide using nano-scattering dots. These dots are located in the evanescent field. In electromagnetics, an evanescent field, or evanescent wave, is an oscillating electric and/or magnetic field that does not propagate as an electromagnetic wave but whose energy is spatially concentrated in the vicinity of the source (oscillating charges and currents).

These nanodots are characterized by an optical index difference with the medium in which the evanescent field is located. The light is then "scattered" around an axis perpendicular to the waveguide. For each dot, this scattered light is detected by a pixel aligned with this axis. The intensity detected is therefore proportional to the intensity inside the waveguide at the exact location of the dot. This results in a linear image of the interferogram. No moving parts are used. A mathematical function known as a Lippman transform, similar to a Fourier transform, is then applied to this linear image and gives the spectrum of the light.

The linear image interferogram is truncated. Only the frequencies corresponding to the zero optical path difference at the mirror, up to the farthest dots are sampled. Higher frequencies are rejected. This truncation of the interferogram determines the spectral resolution. The interferogram is under-sampled. A consequence of this under-sampling is a limitation of the wavelength bandwidth to which the mathematical function is applied.

SWIFTS technology displays the Fellgett (or the multiplex) advantage, which is derived from the fact that an interferometer measures wavelengths simultaneously with the same elements of the detector, whereas a "dispersive spectrometer" measures them successively. Fellgett's advantage also states that when collecting a spectrum whose measurement noise is dominated by detector noise, a "multiplex spectrometer" such as a Fourier-transform spectrometer, will produce a relative improvement in the signal-to-noise ratio (SNR), with respect to an equivalent "scanning monochromator", that is approximately equal to the square root of the number of sample points comprising the spectrum.

SUMMARY

According to one aspect of the disclosed subject matter, a Fourier transform spectrometer implemented on a photonic integrated circuit (PIC) is provided. An input optical signal waveguide carries an input optical signal to be analyzed to an on-chip Y branch splitter to split the input signal equally to carry coupled-optical signals related to the input optical signal into twin array waveguides of a first waveguide array and a second waveguide array. The optical signal from the first waveguide array and the optical signal from the second waveguide array intersect at a preset intersecting angle at an output plane of the PIC such that the spectral and spatial resolutions of the interferogram of the spectrometer are determined by the intersecting angle.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE FIGURES

The features, natures, and advantages of the disclosed subject matter may become more apparent from the detailed description set forth below when taken in conjunction with the drawings in which like reference numerals indicate like features.

DESCRIPTION

Figure 1:
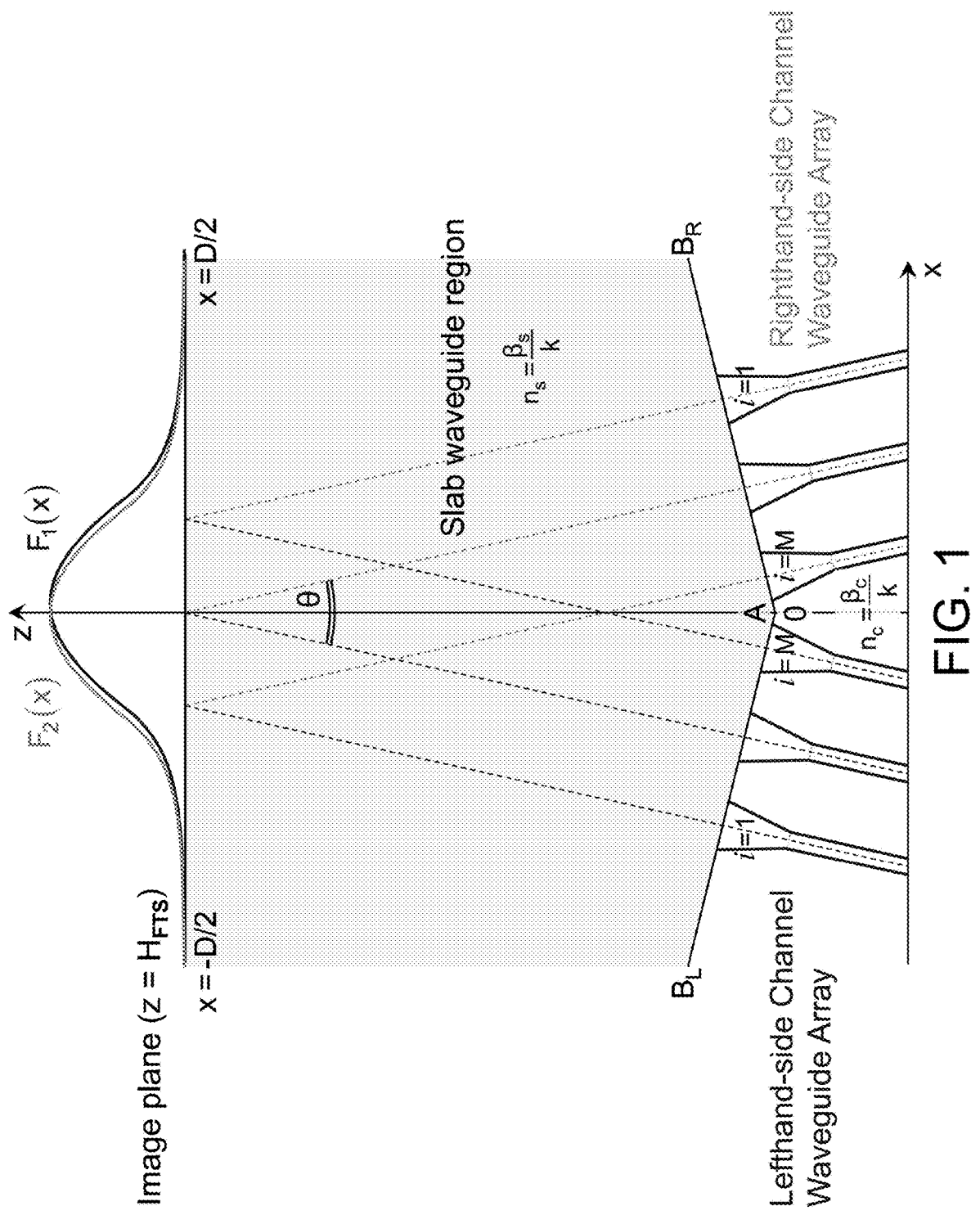
FIG. 1 is a diagram showing an exemplary configuration of a Fourier transform spectrometer based on far-field radiation from two planar and twin waveguide arrays.

The following description is not to be taken in a limiting sense, but is made for the purpose of describing the general principles of the present disclosure. The scope of the present disclosure should be determined with reference to the claims. Exemplary embodiments of the present disclosure may be illustrated in the drawings, like numbers being used to refer to like and corresponding parts of the various drawings. The dimensions of drawings provided are not shown to scale.

The present application provides an innovative, and advantageously miniature, spectroscopic sensor based on an integrated optic circuit such as a Photonic Integrated Circuit (PIC) (e.g., silicon nitride, silicon, indium phosphide) and advantageously based on a silica Planar Lightwave Circuit (PLC) Fourier transform spectrometer. Primary advantages of the interferometric Fourier-transform spectrometer solutions provided include a high optical throughput, compact size, and a relatively easily attained high resolution. In addition to the large throughput advantage, an additional benefit of Fourier transform spectrometer solutions provided compared to grating-based devices includes that the spectral information may be measured at all wavelengths simultaneously.

The term twin refers to identical or mirrored and in the context of twin waveguide arrays means identical or mirrored first and second waveguide arrays, such as the twin leftside and rightside waveguides shown in FIGS. 1-3, 7, and 8A having identical lengths and mirrored structure (e.g., mirrored straight and curved guide portions).

As noted previously, the interferogram of a SWIFTS is normally undersampled (e.g., in larger than a quarter of a light wavelength intervals). Ideally, the perfect sampling period of a sinusoidal standing wave should be equal to (or less than) the quarter of the wavelength in the medium, for example an ~250 nm sampling for a wavelength of 1500 nm. This super-high spatial resolution sub-wavelength sampling is not possible with most of the detector techniques and can only be achieved with very advanced solutions such as integrated SNSPD (Superconducting Nanowire Single Photon Detectors), or the Hot Electron Bolometer (HEB) effect.

In this case, the geometry of the nano-sampler defines the wavelength at which the maximum scattering efficiency occurs. The limited spectral bandwidth of nano-samplers due to degradation of scattering efficiency over bandwidth may be considered the key limitation of the SWIFTS technology. A sampler should not be bigger than the Nyquist- Shannon sample-rate and should be at least four times smaller than the interferogram "guided wavelength" otherwise it may be considered the interferogram is not sampled properly. This requirement prevents the use of an optimum nano-sampler, with respect to its "scattering efficiency", at the design wavelength. The energy extraction required to sample the standing wave is obtained by sampling the evanescent field on one side of the waveguide using nano-samplers located in the evanescent field. These nano-samplers scatter the light around an axis perpendicular to that of propagation of the waveguide. It is known that measurable light intensity from the nano-sampler becomes quite weak. "Confinement factor" varies depending on the signal wavelength. Then, however, precise measurement of the standing wave intensity becomes complicated because the confinement factor is known only after signal wavelength is measured.

In that regard, the present solution in one aspect is directed to a transform spectrometer implemented on a planar waveguide circuit (PLC) based on "array waveguides" to address the conventional SWIFTS problems summarized above.

FIG. 1 is a diagram showing an exemplary configuration of a Fourier transform spectrometer based on far-field radiation from two planar and twin waveguide arrays (righthand-side and lefthand-side). The number of arrayed waveguides is M for both sides and the intersecting angle of the two radiation beams is intersecting angle θ. Phase conditions of the lefthand-side and righthand-waveguide waveguides at the interface A-BL and A-BR, respectively, are made equal by precisely controlling the path length of the channel waveguides (including both straight and curved guide portions). Ideally intersecting angle θ is ~6.6 degrees with a realistic range of 5-7 degrees and a practical minimum of 2 degrees and a maximum of 12 to 15 to 20 degrees.

For θ=0 degrees, the two beams are in parallel and co-propagating in the same direction (thus there is no interference). For θ=180 degrees, the two beams are anti-parallel and counter-propagating as in traditional SWIFTS based technology.

The present application provides a Fourier transform spectrometer based on "far-field" radiation from two planar waveguide arrays—a righthand side array and a lefthand side array—intersecting at a preset angle θ. The intersecting angle θ determines the spectral and spatial resolutions. Phase conditions of the lefthand-side and righthand-side waveguides are made equal by precisely controlling the path length of the channel waveguides. A "segmented taper region" advantageously and efficiently couples the optical power from each slab region to the array waveguides on each side. A Gaussian profile approximates electric field distribution of the channel waveguides. The total farfield radiation pattern from the lefthand-side and righthand-side waveguide arrays is approximated by the sum of two Gaussian functions of farfield radiation from the two arrays. The resulting interferogram has a Cosine term with a "period" and "spatial frequency".

This resulting interferogram is imaged from the output plane of the planar waveguide circuit (PLC), for example the output edge of the PLC, to a high spatial resolution camera through lens. Thus, the intersecting angle θ allows for a reduced number of detectors. In other words, the interference occurs at the edge of the PLC and a computer processor connected camera is positioned to capture that interference occurring at the PLC output edge. The smaller θ is the smaller the PLC output interferogram spatial resolution may be. For example, a 0.5 micron sampling period at the output of the PLC passed through an imaging lens with 10× magnification (e.g., via a 10× magnifying lens) will result in a 5 micron period to match the camera pixel pitch for proper detection. The camera output may then be sent to a computer processor to perform the necessary signal processing and computations to generate the spectrum of the input signal. In other words, twin array waveguides having a first waveguide array and a second waveguide array, the optical signal from twin waveguide arrays intersecting at a preset intersecting angle generate interference of the two waves from the output of the two intersecting waveguide arrays resulting in an interferogram at the output plane of PLC whereby the interferogram is processed to obtain the spectrum by taking Fourier transform.

The DC offset of the interferogram may be calculated using a "smoothing algorithm" such as "least squares regression" analysis. Then proper "window function" (e.g., Hann window) may be multiplied to the Cosine term. Fourier transform of the processed interferogram provides the spectrum of the signal. Spectral lines in the region above the maximum design wavelength induce spectral aliasing (and should not be used). Multiplication of the window function results in a distortion in the spectrum. To correct amplitude distortion of the spectrum, the peak amplitude is curve fitted by a polynomial of suitable order.

A 3D spectrometer system is also disclosed, containing multiple stacked PLCs, each having a transform spectrometer.

The following structures, methods for their manufacture, and methods of their use as a spectrometer, also form part of the disclosed innovations. Including a camera detector array with a suitable pixel pitch for receiving output optical signals from the PLC output through an imaging magnifying lens. In another embodiment, detection is performed by one or more moving detectors mounted to move at the output of the PLC where the interferogram is formed. In this case, a means for determining the position of the detector is included. In another embodiment, detector arrays are outside the PLC, eliminating light reflections present in some conventional SWIFTS based spectrometers.

Including a processor that is communicatively coupled to the output of the camera detector array pixels, the processor being configured to process the spatial domain interference pattern image using a frequency domain transform to determine information about the spectral content of the light. A computer that can be a processor, a microprocessor, or a Digital Signal Processor (DSP), for analogue or digital processing. For computational efficiency, it is possible to parallelize the processing.

Figure 2:
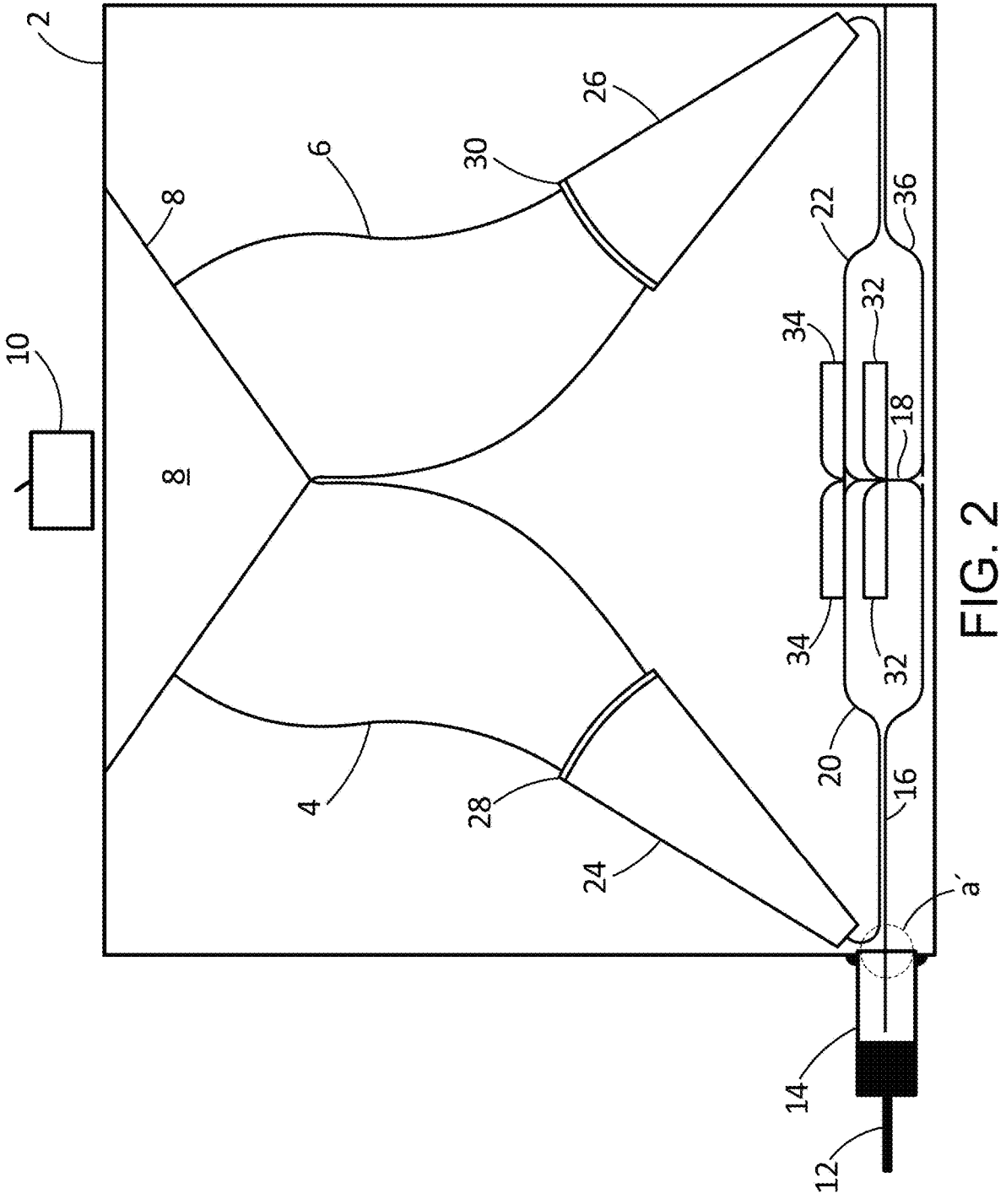
FIG. 2 is a diagram showing an exemplary Fourier transform spectrometer implemented on a planar waveguide circuit (PLC) using twin waveguide arrays.

FIG. 2 is a diagram showing an exemplary Fourier transform spectrometer implemented on a planar waveguide circuit (PLC) using twin waveguide arrays (e.g., channel waveguides). Leftside waveguides array 4 and rightside waveguides array 6 are twin waveguides arrays having identical (mirrored) structure on PLC 2. Leftside free propagation region (FPR) 24, for example a slab region, and leftside segmented taper region 28 (leftside segmented taper region 28 coupling the light from FPR slab region 24 to leftside array waveguides 4) form the leftside array waveguide having precisely controlled lengths (both straight and curved guides) and phasefronts. Rightside free propagation region (FPR) 26, for example a slab region, and rightside segmented taper region 30 (rightside segmented taper region 30 coupling the light from FPR slab region 26 to rightside array waveguides 6) form the rightside array waveguide having precisely controlled lengths (both straight and curved guides) and phasefronts. The interferogram is formed in output plane 8 (a triangular FPR slab). Camera detector array 10 is positioned where the interferogram (the two leftside and rightside interfering waves) is detected through a proper imaging optics.

Input waveguide 20 provides optical input to leftside FPR 24 and for leftside array waveguide as a whole. Input waveguide 22 provides optical input to rightside FPR 26 and for rightside array waveguide as a whole. Input waveguide to the input Y branch splitter 18, lower clad-mode deflect region 32 in the Y branch splitter, and upper clad-mode deflect region 34 in the Y branch splitter form the input Y branch splitter which splits the input signal equally from one of the input waveguide pair 16 (the second input waveguide is referred to as alignment waveguide is also advantageous for PLC packaging or fiber pigtailing). Input upper waveguide pair 16 receives input signal from input optical fiber 12 held by packaging fixture 14 (i.e., packaging fixture 14 holds input optical fiber 12), a' indicates the interface between the input optical fiber and the PLC. Output alignment waveguide 36 may be used for PLC packaging or fiber pigtailing. In other words, 16 is the input waveguide and is split by a lower Y branch splitter into a waveguide that goes into the second Y-branch splitter 18 and waveguide 36 that goes to the lower right side of the PLC to be used for packaging alignment. Thus there is one input waveguide and two Y branch splitters, which may be more readily apparent in the drawing of FIG. 3.

Figure 3:
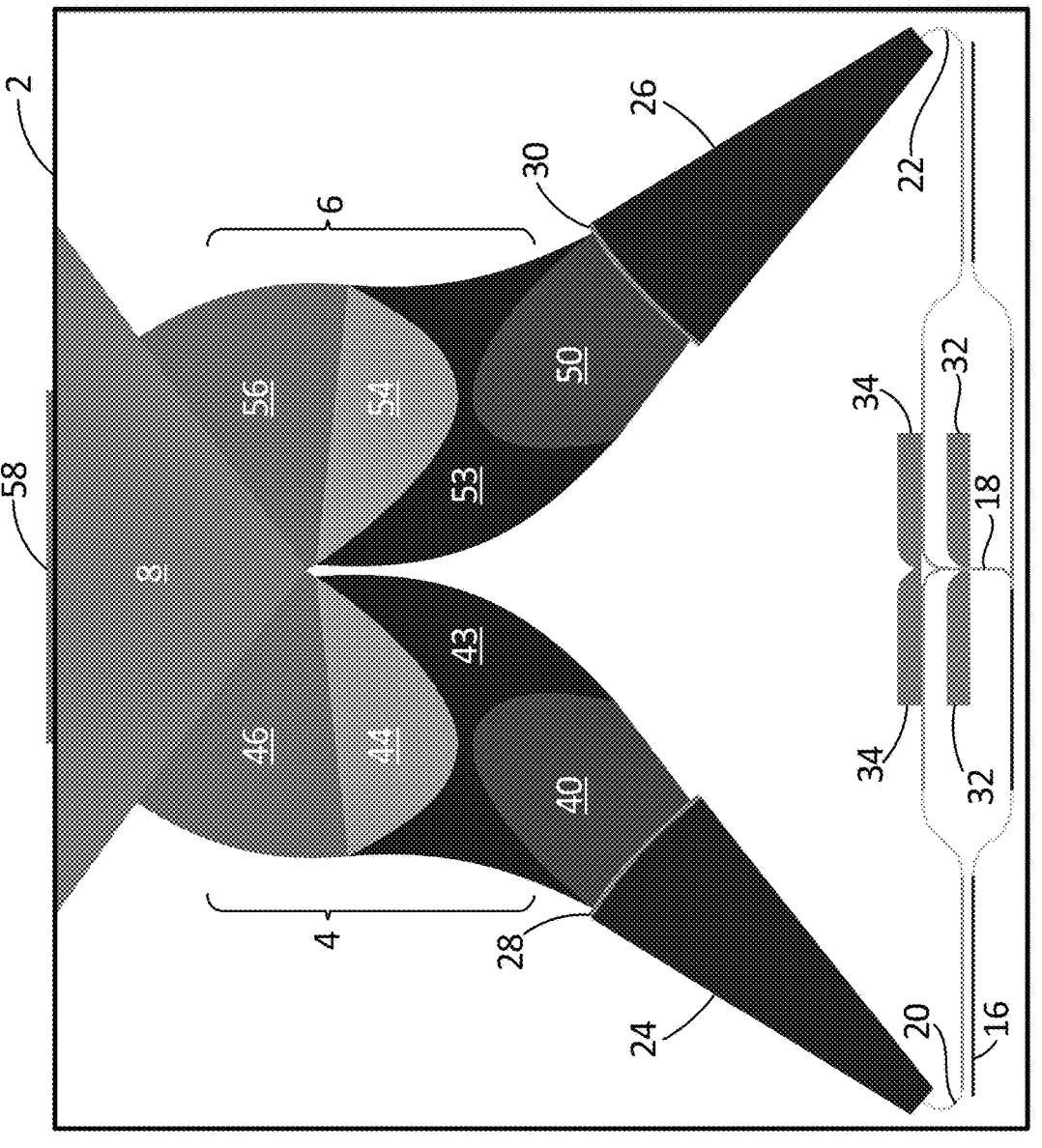
FIG. 3 is a diagram showing the exemplary Fourier transform spectrometer implemented on a planar waveguide circuit (PLC) using twin waveguide arrays of FIG. 2.

FIG. 3 is a diagram showing the exemplary Fourier transform spectrometer implemented on a planar waveguide circuit (PLC) using twin waveguide arrays of FIG. 2 and showing waveguide detail of leftside waveguides array 4 and rightside waveguides array 6. Leftside straight waveguides 40 and leftside curved waveguides 43, 44, and 46 (of proper length to control the leftside wavefront) form leftside waveguides array 4. Rightside straight waveguides 50 and rightside curved waveguides 53, 54, and 56 (of proper length to control the rightside wavefront) form rightside waveguides array 6. There are different curved waveguide regions (leftside curved waveguides 43, 44, and 46 and rightside curved waveguides 53, 54, and 56) with different orientations to have different waveguide lengths needed to control the wavefronts (phases) of the propagating waves. Region 58 represents the effective length at the output triangular base (output plane 8) where the interferogram is formed.

Figure 4:
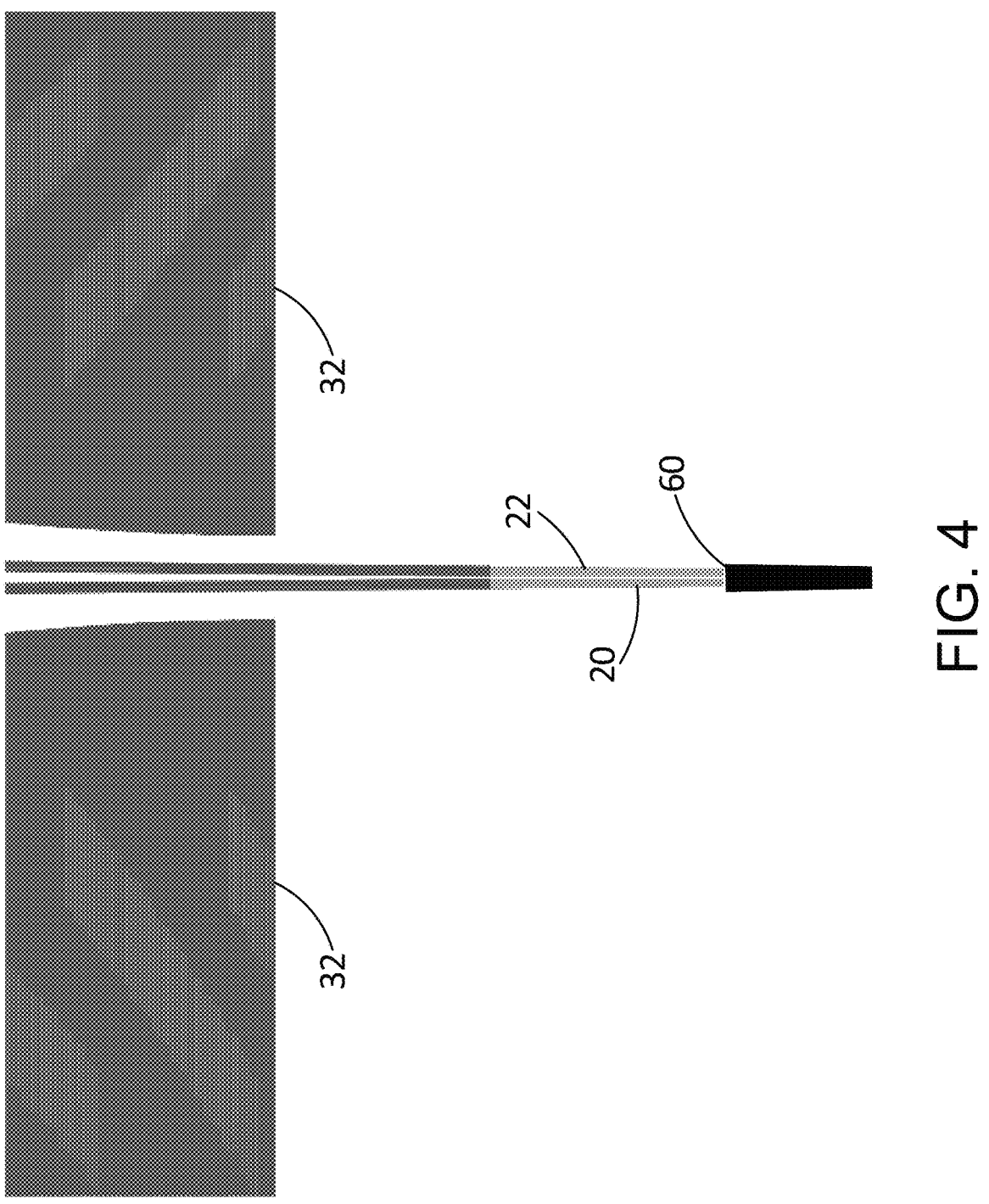
FIGS. 4 and 5 are drawings showing the input Y branch splitter of FIG. 2.
Figure 5:
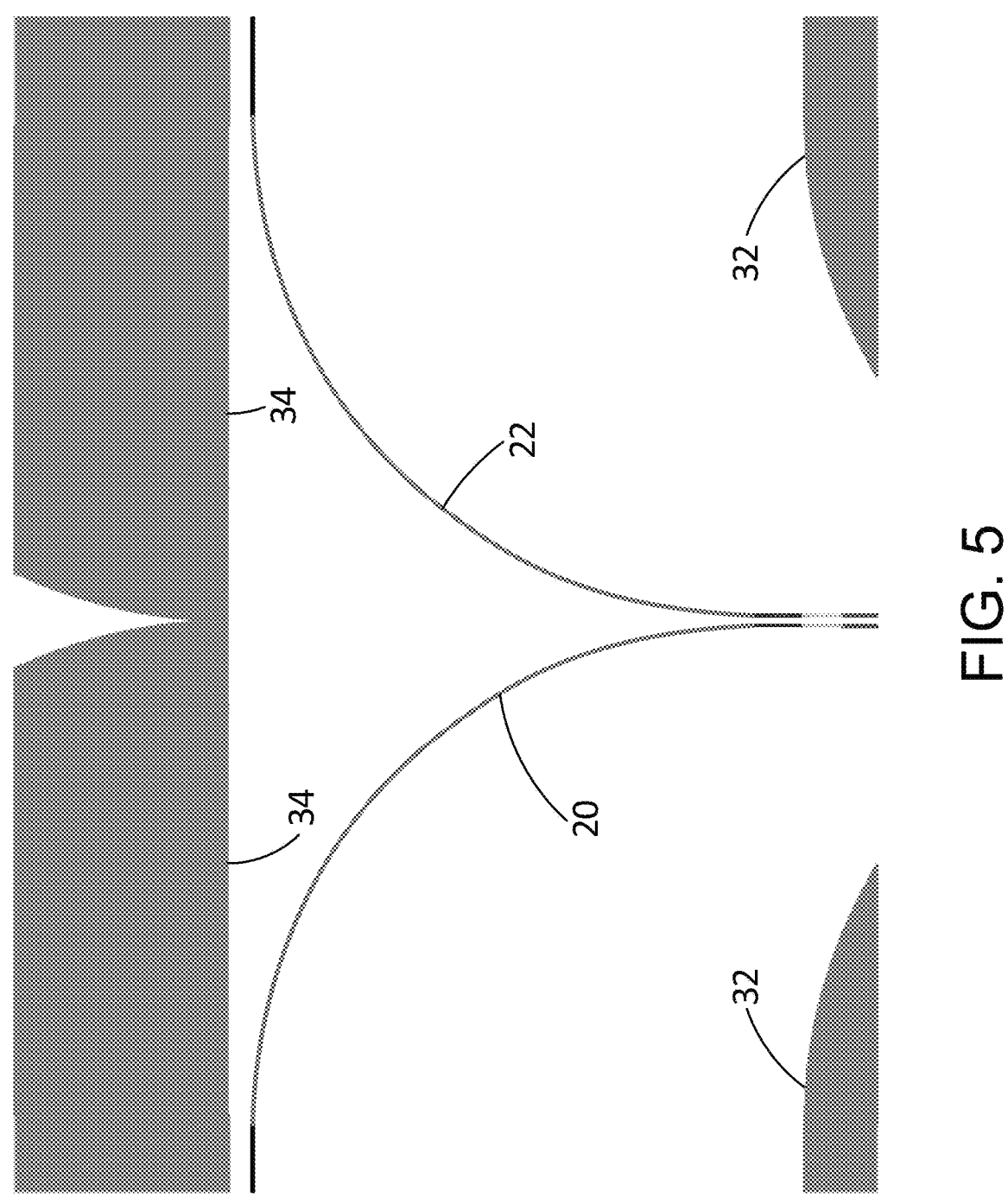

FIG. 4 is a drawing showing a detailed view of lower clad-mode deflect region 32, input waveguide 20, input waveguide 22, and Y branch splitter start point 60 of the input Y branch splitter of FIG. 2. And FIG. 5 is a drawing showing a detailed view of lower clad-mode deflect region 32, input waveguide 20, input waveguide 22, and upper clad-mode deflect region 34 of the input Y-branch splitter of FIG. 2. The lower clad-mode and upper clad-mode regions of the input Y branch splitter of FIGS. 3 and 4 act as unwanted light deflectors, thus Y branch splitter deflects undesirable radiated leakages to not interfere with the proper operation of the interferogram.

Figure 6:
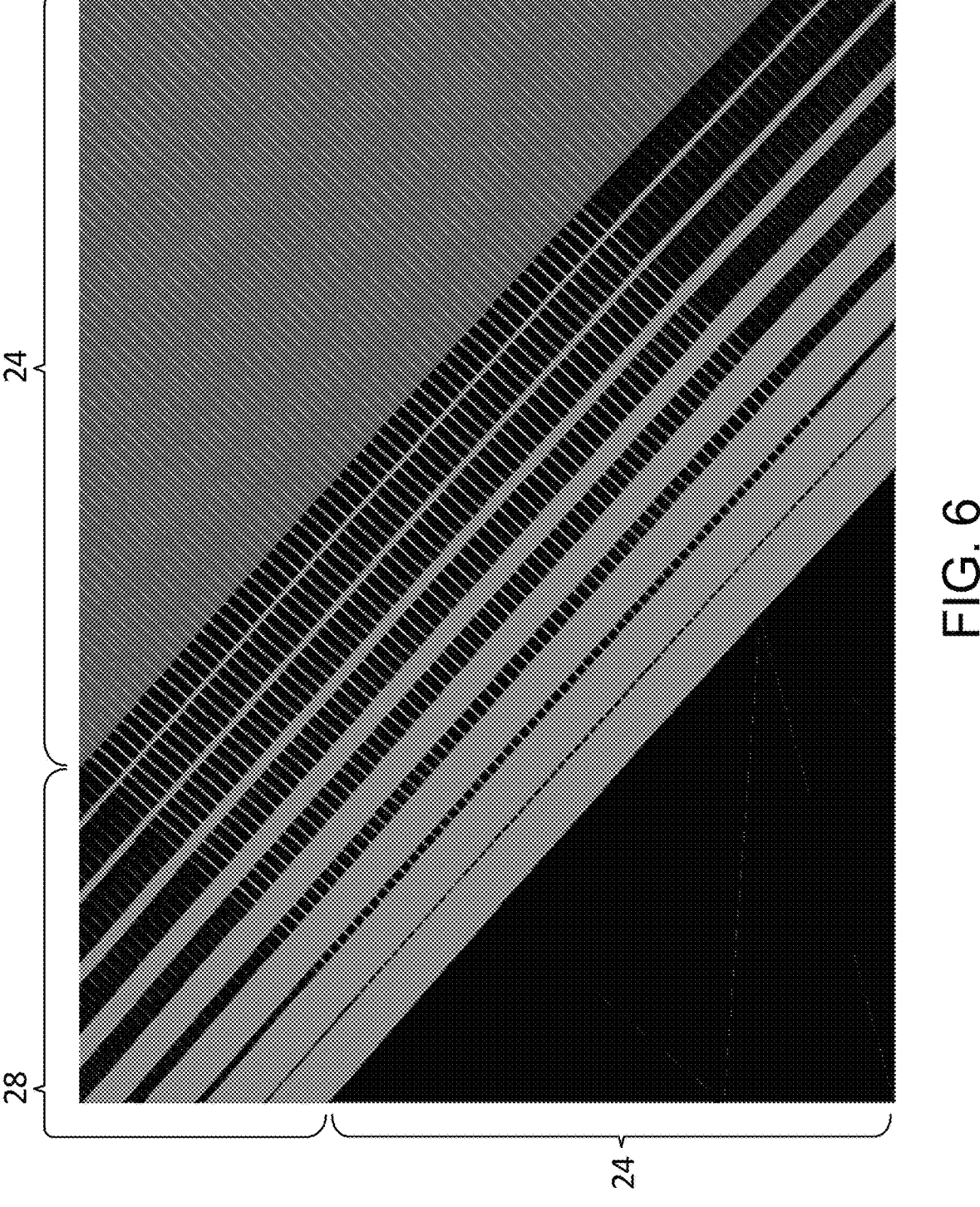
FIG. 6 is a drawing showing a detailed view of FIG. 3.

FIG. 6 is a drawing showing a detailed view of leftside segmented taper region 28 coupling the light from FPR slab region 24 to leftside array waveguides 4 (specifically leftside straight waveguides 40 of leftside array waveguides 4) of FIG. 3.

Figure 7:
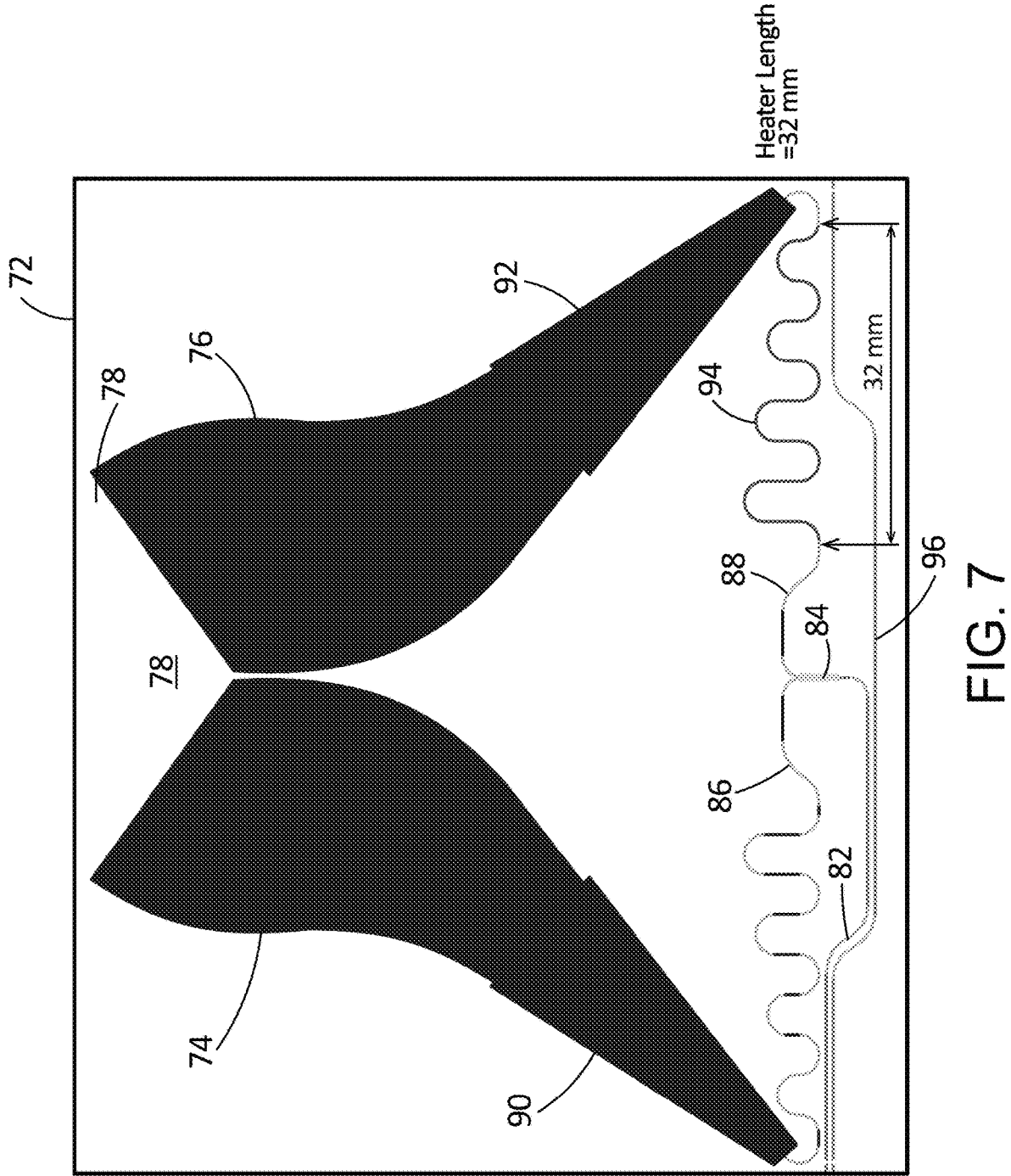
FIG. 7 is a diagram showing an exemplary Fourier transform spectrometer implemented on a planar waveguide circuit (PLC) using twin waveguide arrays and a thermo-optic (TO) micro-heater.

FIG. 7 is a diagram showing an exemplary Fourier transform spectrometer implemented on a planar waveguide circuit (PLC) using twin waveguide arrays and a thermo-optic (TO) micro-heater on the input waveguide of the rightside array. Leftside waveguides array 74 and rightside waveguides array 76 are twin waveguides arrays having identical (mirrored) structure on PLC 72. Leftside free propagation region (FPR) 90, for example a slab region (segmented taper region not shown) and leftside waveguides array 74 form the leftside array waveguide. Rightside free propagation region (FPR) 92, for example a slab region (segmented taper region not shown) and rightside waveguides array 76 form the rightside array waveguide. The interferogram is formed in output plane 78 (a triangular FPR slab).

Input waveguide 86 provides optical input to leftside FPR 90 and for leftside array waveguide as a whole. Input waveguide 88 provides optical input to rightside FPR 92 and for rightside array waveguide as a whole. Input waveguide 82 provides optical input to Y branch splitter 84 which splits the input signal equally into input waveguide 86 and input waveguide 88. Thus, the PLC of FIG. 7 has one Y branch splitter, with 82 as the input waveguide to the input of the Y branch splitter 84. Alignment waveguide 96 is advantageous for PLC packaging, or fiber pigtailing, and travels from the lower left side of PLC 72 to the lower right side of PLC 72. Waveguides 82 and 96 are close to each other but optically decoupled. Thermo-Optic micro-heater 94, for example having a heater length of 32 mm, provides thermo-optic phase shift. The addition of a thermo-optic (TO) micro-heater at the input waveguide of either the leftside or rightside array waveguide (and immediately after the Y branch splitter) allows for the performance spectral interpolation to compute the spectrum without a magnifying lens.

Figure 27A:
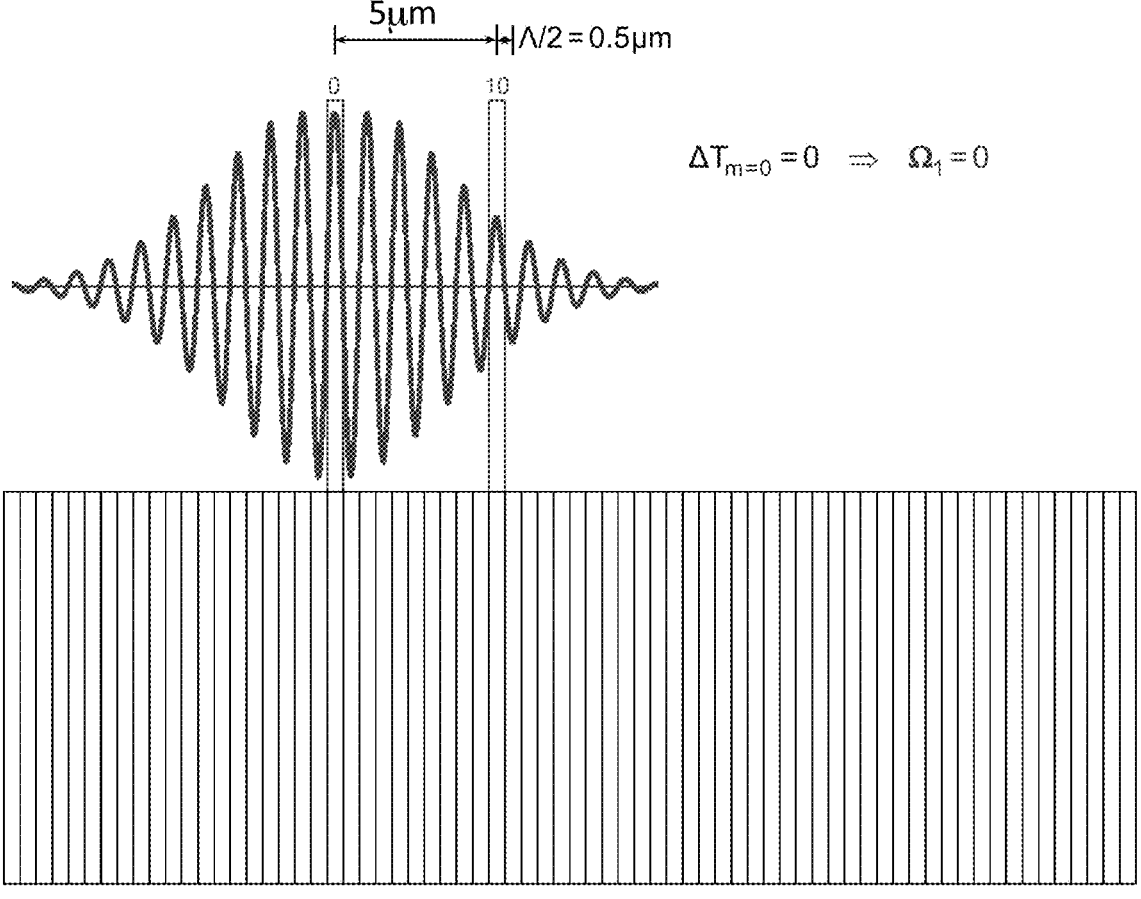
Figure 27B:
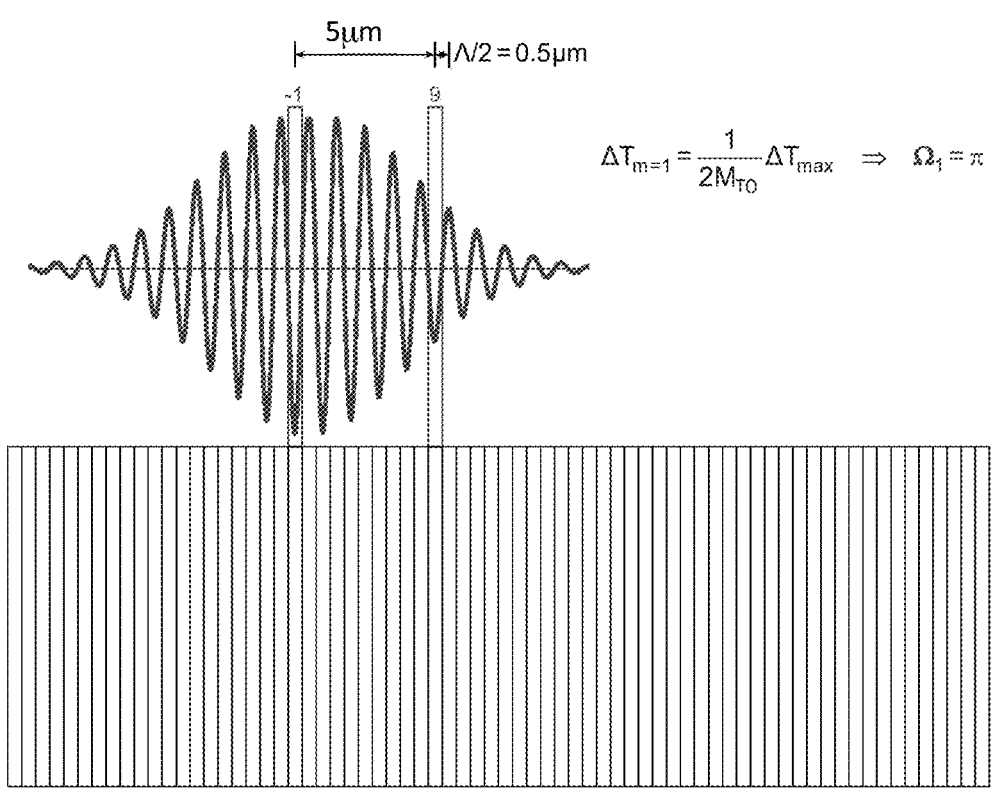
Figure 27C:
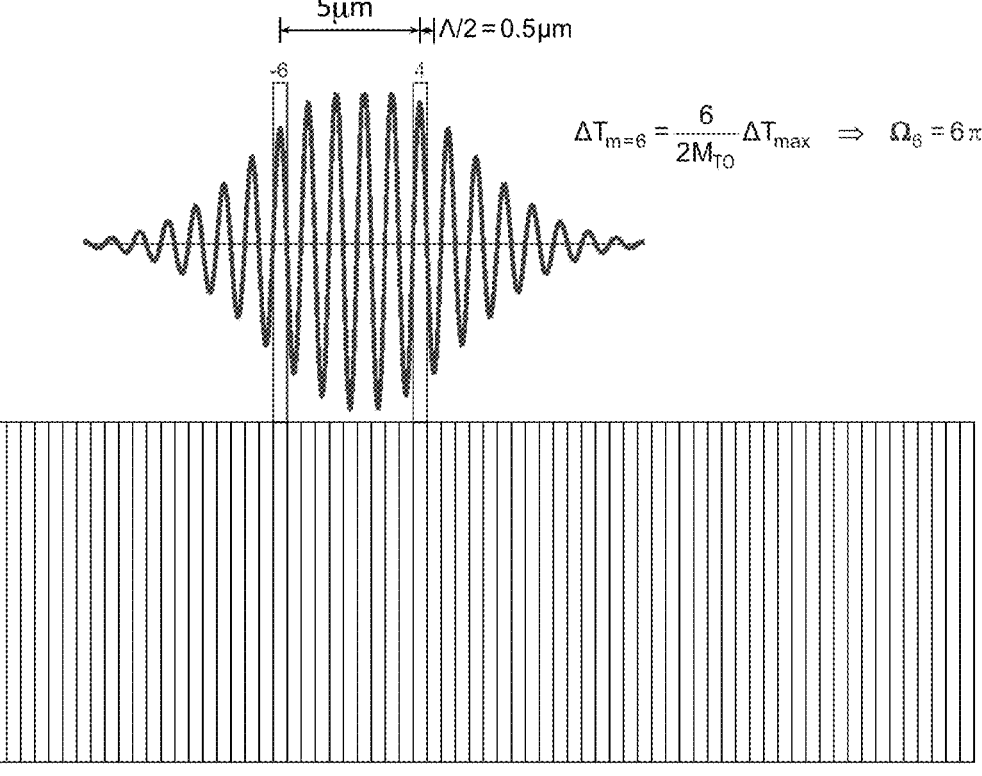
Figure 27D:
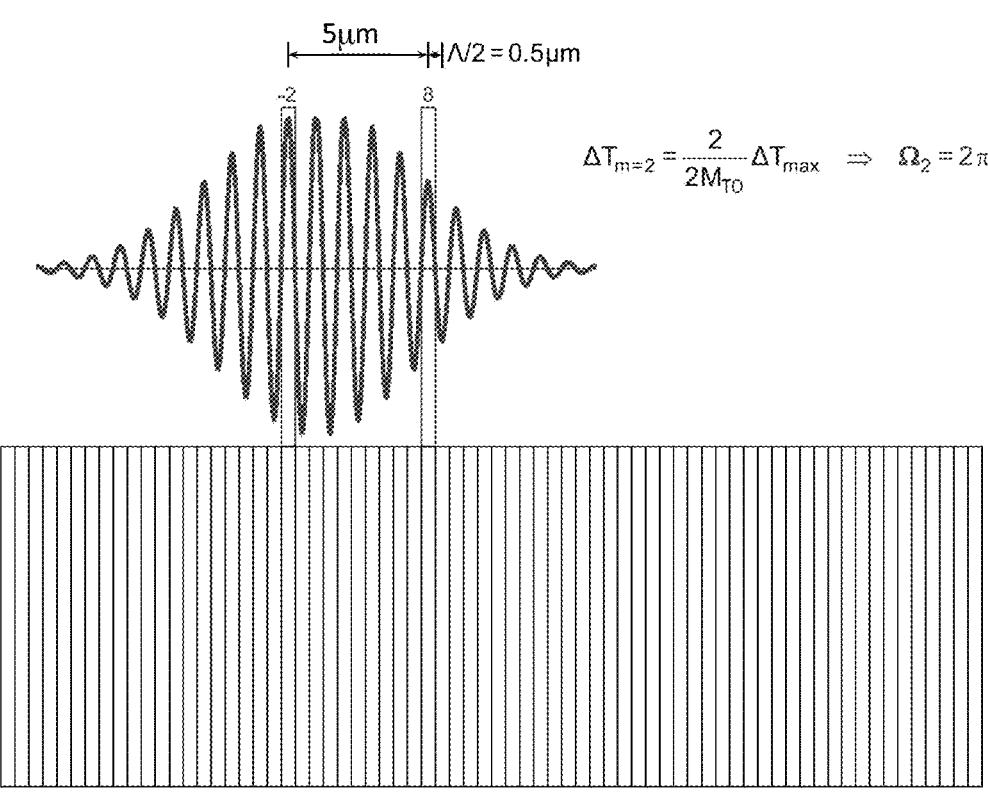
Figure 27E:
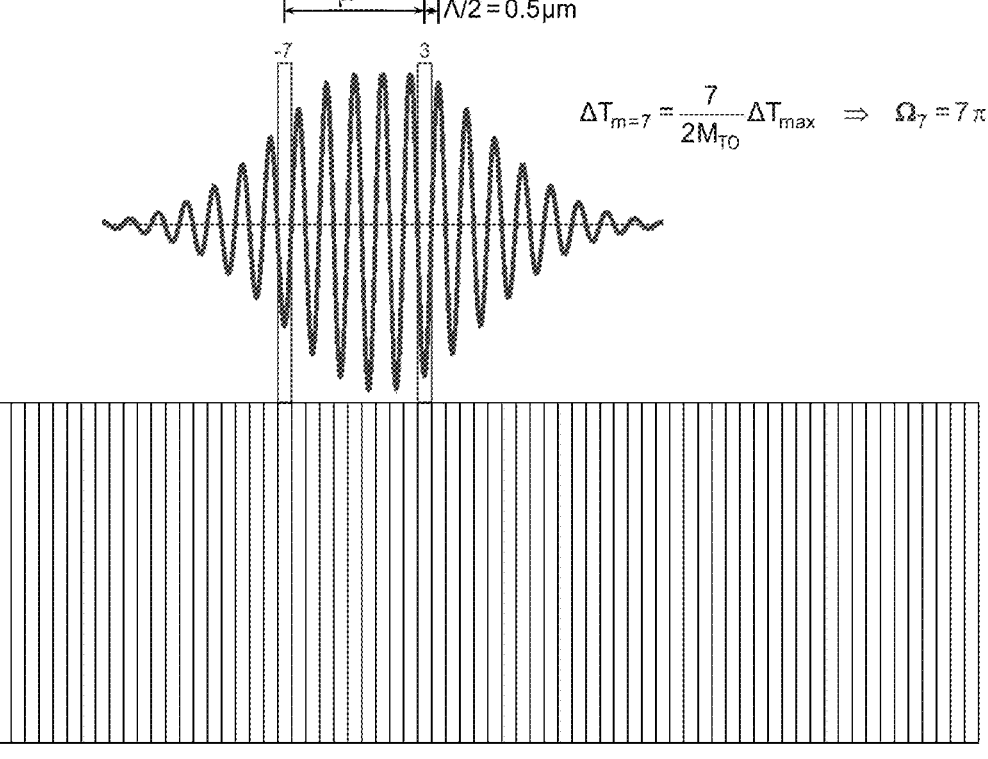
Figure 27F:
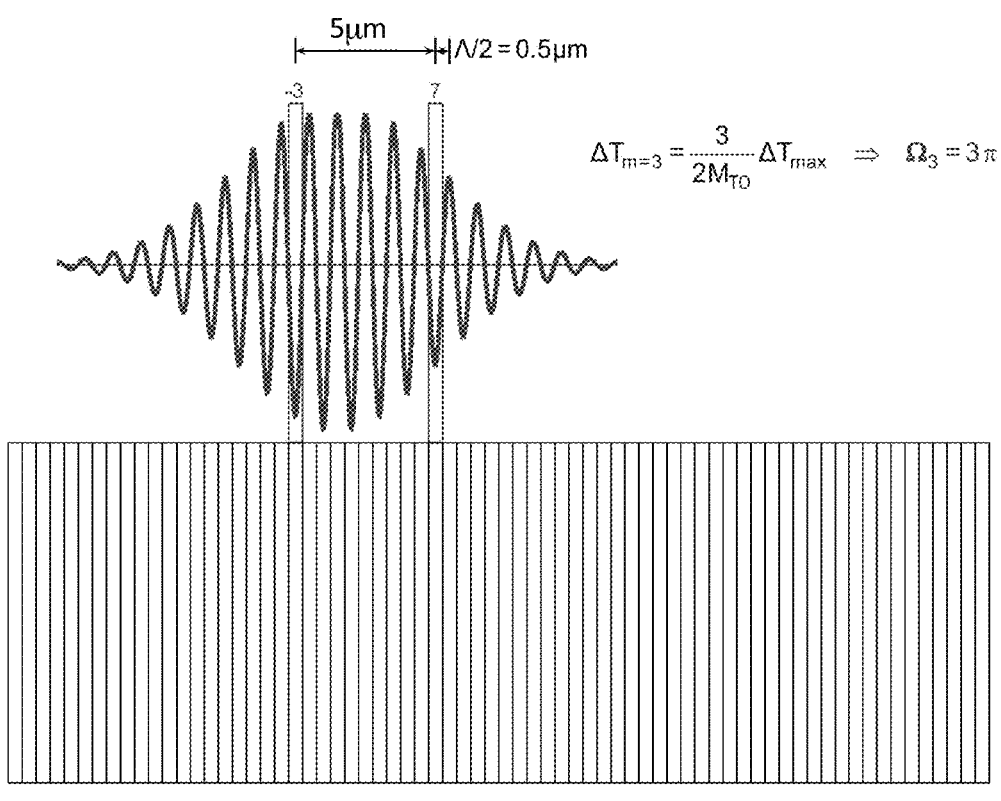
Figure 27G:
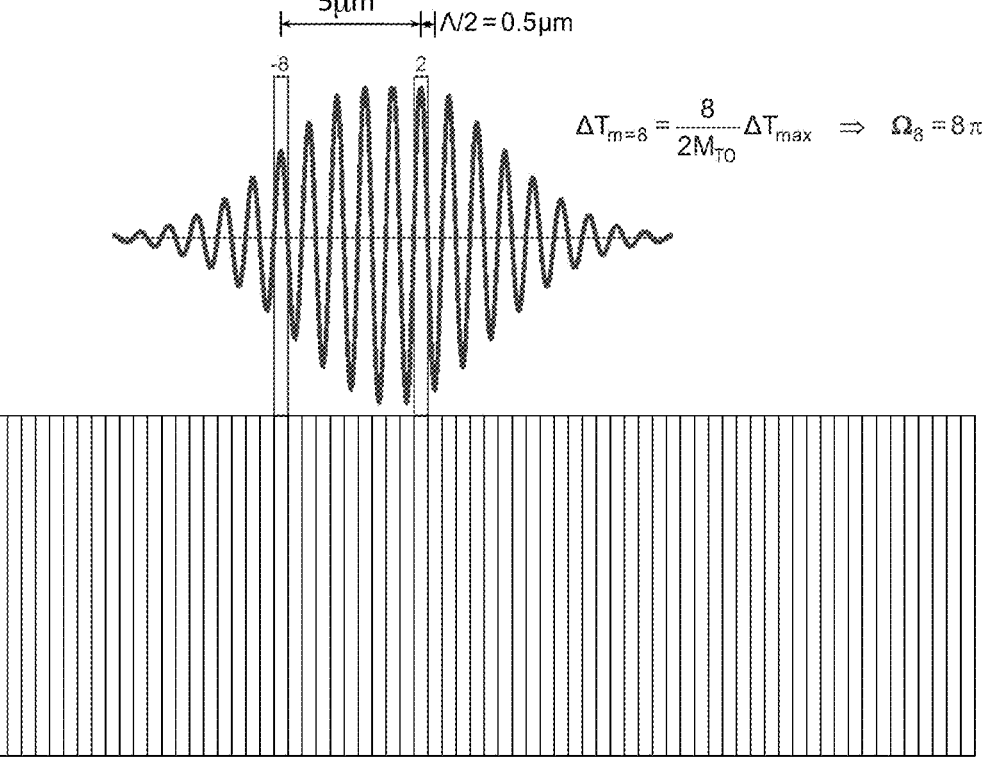
Figure 27H:
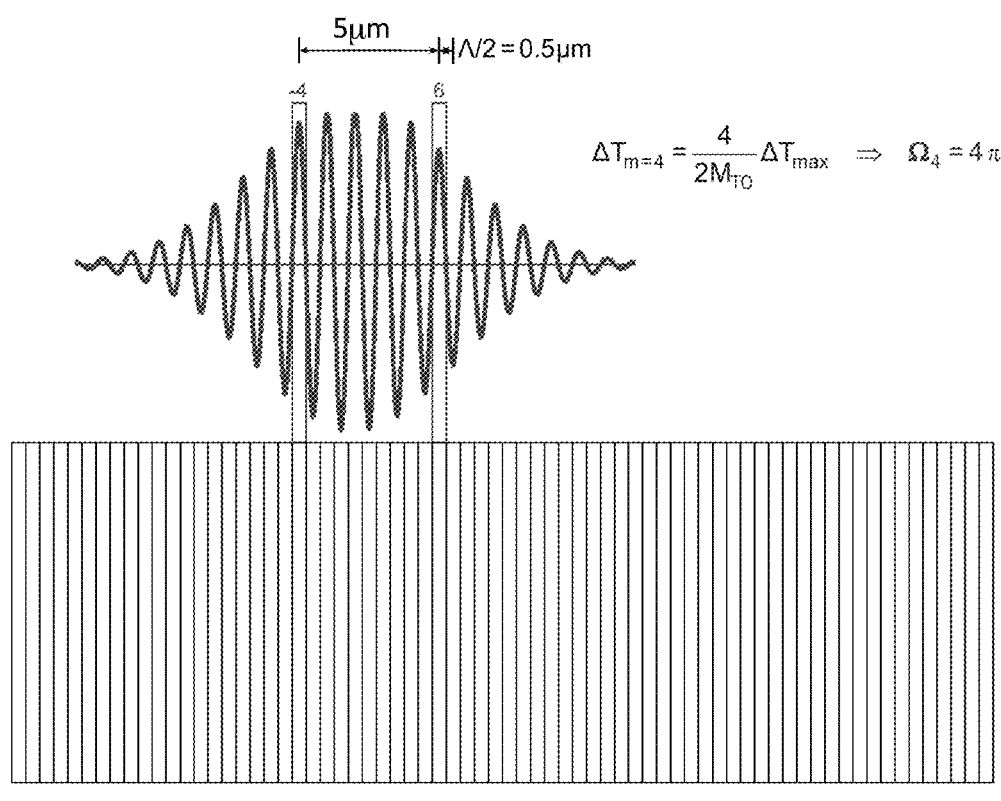
Figure 27I:
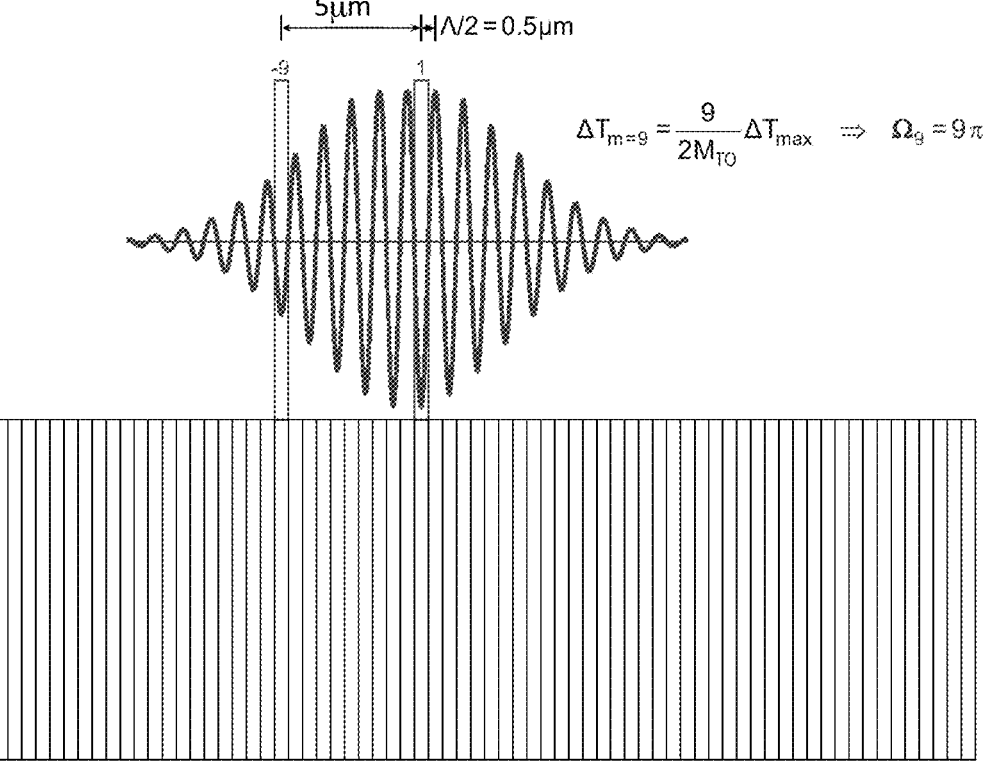
Figure 27J:
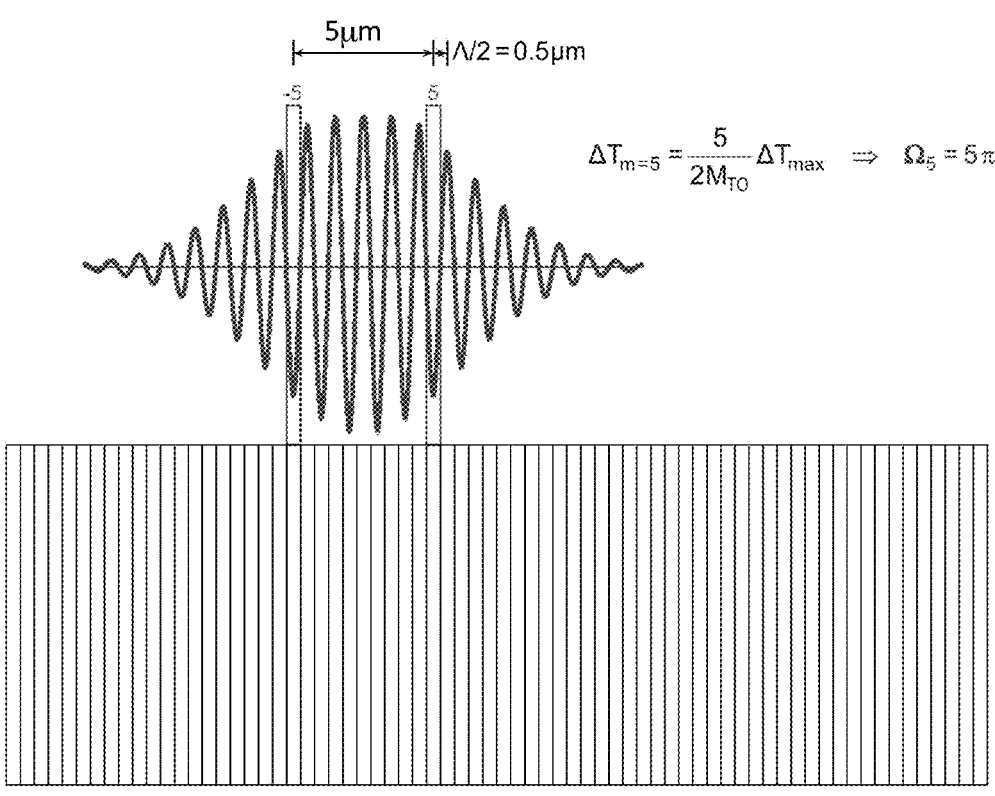
Figure 27K:
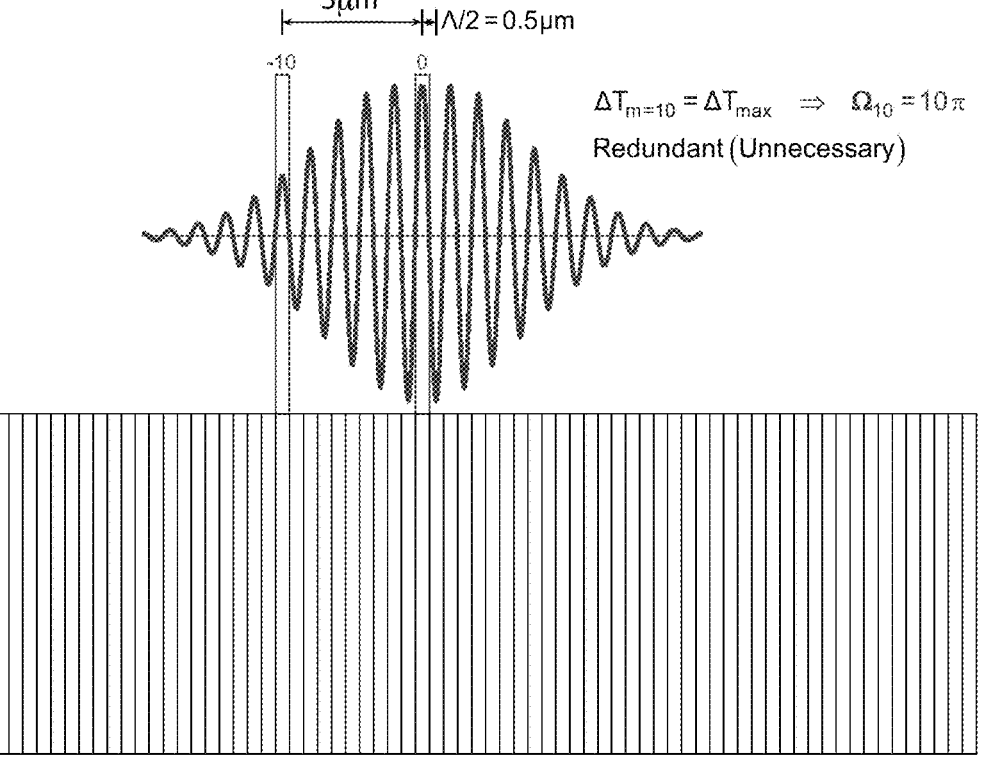

Interpolation by using Thermo-Optic Shift of the Interferogram. Thermo-Optic (TO) phase shift of the interferogram from 0 to $9\pi$ in 10 increments of $\pi$ allows for the use of a camera detector array with no magnifying lens, by shifting the interferogram position in increments, then using interpolation to compute the spectrum. Thus, the spectrometer is more compact but takes more time to compute the spectrum. In this example, 10 equal increments correspond to the ratio of a camera pixel pitch of 5 microns to an on-chip interferogram sampling interval of 0.5 microns. The $10\pi$ phase shift is redundant (repeats the shift cycle) as shown in the graphs of FIGS. 27A through 27K (FIG. 27A showing zero phase shift of the interferogram). FIGS. 27A through 27K are graphs showing Thermo-Optic (TO) induced phase shifts from 1 to $10\pi$ in increments of x for spectral interpolation. The $10\pi$ phase shift is redundant (repeats the shift cycle).

Calculations, results, and assumptions relating to interpolation by using Thermo-Optic shift of the interferogram may be more readily understood as follows.

Interpolation by Using Thermo-Optic Shift of the Interferogram

Phase Change in the Waveguide Core Due to Temperature Change $\Delta T$ $$\Omega = \delta\left(\frac{2\pi n_c}{\lambda}L_{TO}\right) = \frac{2\pi L_{TO}}{\lambda}\delta n_c = \frac{2\pi L_{TO}}{\lambda}\frac{dn_c}{dT}\Delta T$$

$$\frac{dn_c}{dT} = 1.02 \times 10^{-5 \circ} C.^{-1}(SiO_2)$$

$$L_{TO} = 32 \text{ mm}$$

-continued $$\Lambda =$$

$$1.0 \ \mu m: \text{Interferogram Period} \Rightarrow S_D = \frac{\Lambda}{2} = 0.5 \ \mu m: \text{Sampling Interval}$$

$$W_{pxl} = 0.5 \ \mu m: \text{Pixel Pitch (Sony)} \Rightarrow M_{TO} = \frac{W_{pxl}}{\Lambda} = 5$$

$$\lambda = 1.55 \ \mu m$$

$$\Delta T_{max} = 23.74° \text{ C.: Maximum Temperature Change in the core}$$

$$\Omega_{max} = \frac{2\pi L_{TO}}{\lambda}\frac{dn_c}{dT}\Delta T_{max} =$$

$$\frac{2\pi \cdot 32000}{1.55} \cdot 1.02 \times 10^{-5} \cdot 23.74 = M_{TO} \cdot 2\pi: \text{Maximum Phrase Change}$$

$$\Omega_m = \frac{2\pi L_{TO}}{\lambda}\frac{dn_c}{dT}\Delta T_m = \frac{m}{2} \cdot 2\pi \ (m = 0 \sim 2M_{TO} - 1) \Leftarrow 2 = \Lambda/S_D$$

$$\Delta T_m = \frac{m}{2M_{TO}}\Delta T_{max}$$

Figures 8A, 8B:
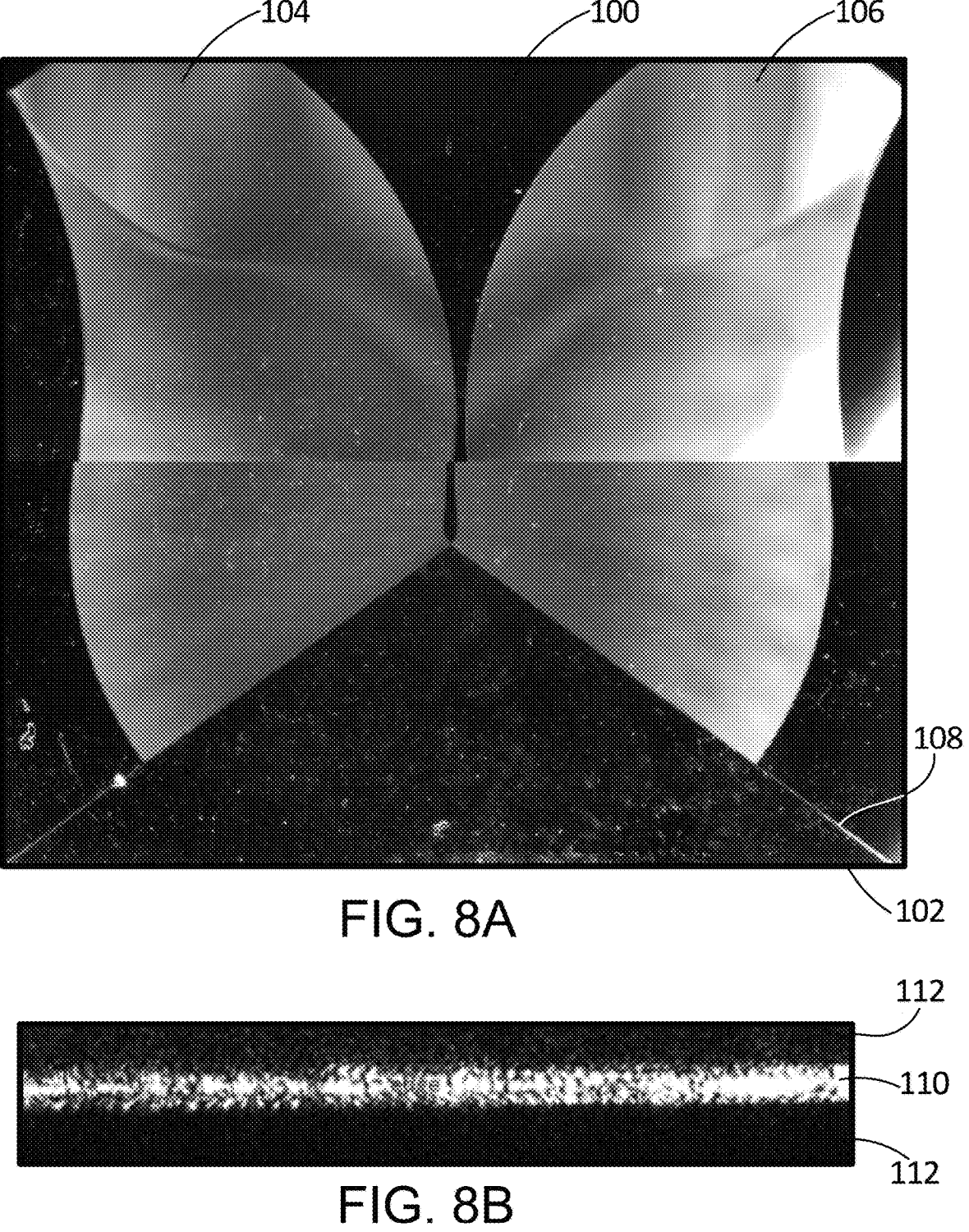
FIGS. 8A and 8B are images of an exemplary Fourier transform spectrometer sample implemented on a planar waveguide circuit (PLC).

FIG. 8A is a image of an exemplary Fourier transform spectrometer sample implemented on a planar waveguide circuit (PLC) using twin waveguide arrays showing the triangular base (output plane 108) at the bottom of the image (image bottom 102) and leftside waveguides array 106 and rightside waveguides array 104 at the top of the image (image top 100)—a 180 degree rotation as compared to the drawings of FIGS. 1-3, and 7 and highlighting the structural position of the features provided herein as compared to their description relative to the orientation of the figures provided for descriptive purposes (e.g., left and right).

FIG. 8B is a photograph of an exemplary Fourier transform spectrometer implemented on a planar waveguide circuit (PLC) using twin waveguide arrays of FIG. 8A and showing a PLC edge view. Interferogram 110 is shown within PLC 112.

FIGS. 8A and 8B show an example of non-optimized fabricated PLC chip in silica with the dark-bright spots in the interferogram formed at the output of the chip (interferogram 110). In this case of the PLC chip of FIGS. 8A and 8B, the light source was a tunable laser source.

Thus, the innovations described herein, in one aspect, are directed to a transform spectrometer implemented on a planar waveguide circuit (PLC) based on "array waveguides" to address the conventional SWIFTS problems summarized herein, including SWIFTS Under-Sampling. The interferogram of a SWIFTS is normally under-sampled. Ideally, perfect sampling period ($\Delta x$) of a sinusoidal standing wave should be equal to (or less than) the quarter of half of the wavelength ($\Delta x \leq \lambda/4n$), where, $\lambda$ is the wavelength of light and n is the refractive index of the medium, for example $\Delta x \sim 250$ nm for a wavelength of 1500 nm. This super-high spatial resolution sub-wavelength sampling is not possible with most of the detector techniques and can only be achieved with very advanced solutions such as integrated SNSPD (Superconducting Nanowire Single Photon Detectors).

Calculations, results, and assumptions relating to Fourier transform spectrometers using twin waveguide arrays may be more readily understood as follows.

Sampling of evanescent standing-waves is achieved using a collection of optical gold nano-samplers. Pitch of nano-samplers is typically 4 $\mu m$. In order to decrease the net pitch of nano-samplers, a line of nano-samplers is repeated into many lines with slightly shifting the initial position of nano-samplers (sampling interval) Sampling interval of 0.25 $\mu m$ was realized by laying out 16 lines (=4 $\mu m$/0.25 $\mu m$) of nano-samplers.

In the context of SWIFTS and SWIFTS technology, the present application provides an innovative solution based on "array waveguides" addressing the following conventional SWIFTS problems, challenges, and shortcomings:

a. The geometry of the nano-sampler defines the wavelength at which the maximum scattering efficiency occurs. The limited spectral bandwidth of nano-samplers due to degradation of scattering efficiency over bandwidth is the key limitation of the SWIFTS technology.

b. A sampler should not be bigger than the Nyquist-Shannon sample-rate and should be at least 4 times smaller than the interferogram "guided wavelength" otherwise the interferogram is not sampled properly. For instance, at 633 nm with a guided wavelength of 422 nm ($n_c = \beta_c/k = 1.5$), the sampler diameter should be 53 nm ($\sim$211 nm/4). This requirement prevents the use of an optimum nano-sampler, with respect to its "scattering efficiency", at the design wavelength.

c. The energy extraction required to sample the standing wave is obtained by sampling the evanescent field on one side of the waveguide using nano-samplers ($\sim$50 nm) located in the evanescent field. These nano-samplers scatter the light around an axis perpendicular to that of propagation of the waveguide.

Figure 9:
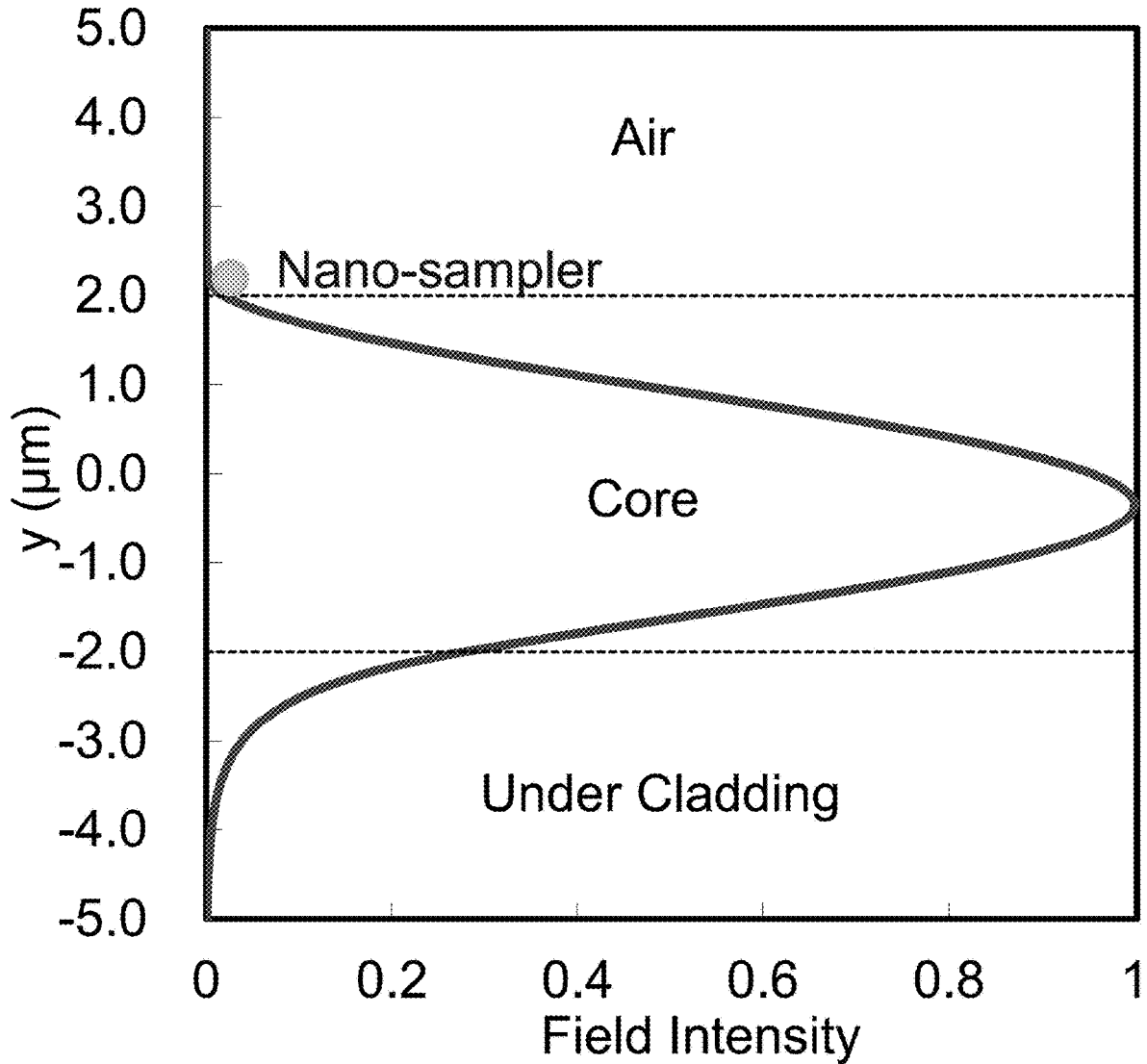
FIG. 9 is a graph showing detection of standing wave intensity.

Evanescent light intensity in the air-clad waveguide is only 0.4% of the total intensity in the waveguide as shown in FIG. 9. Refractive indices of the waveguide in FIG. 9 are $n_{core}=1.47406$, $n_{underclad}=1.44428$, and $n_{air}=1.0$. It is known that measurable light intensity from the nano-sampler becomes quite weak. FIG. 9 is a graph showing detection of standing wave intensity by nano-samplers on the surface of the core having a silica-based waveguide with core size $2ax2t=4.0\times4.0~\mu m^2$, refractive-index difference $\Delta=2.0\%$, and wavelength of light $\lambda=1.55~\mu m$.

"Confinement factor" varies depending on the signal wavelength. Then, precise measurement of the standing wave intensity becomes complicated because the confinement factor is known only after signal wavelength is measured.

Figure 10:
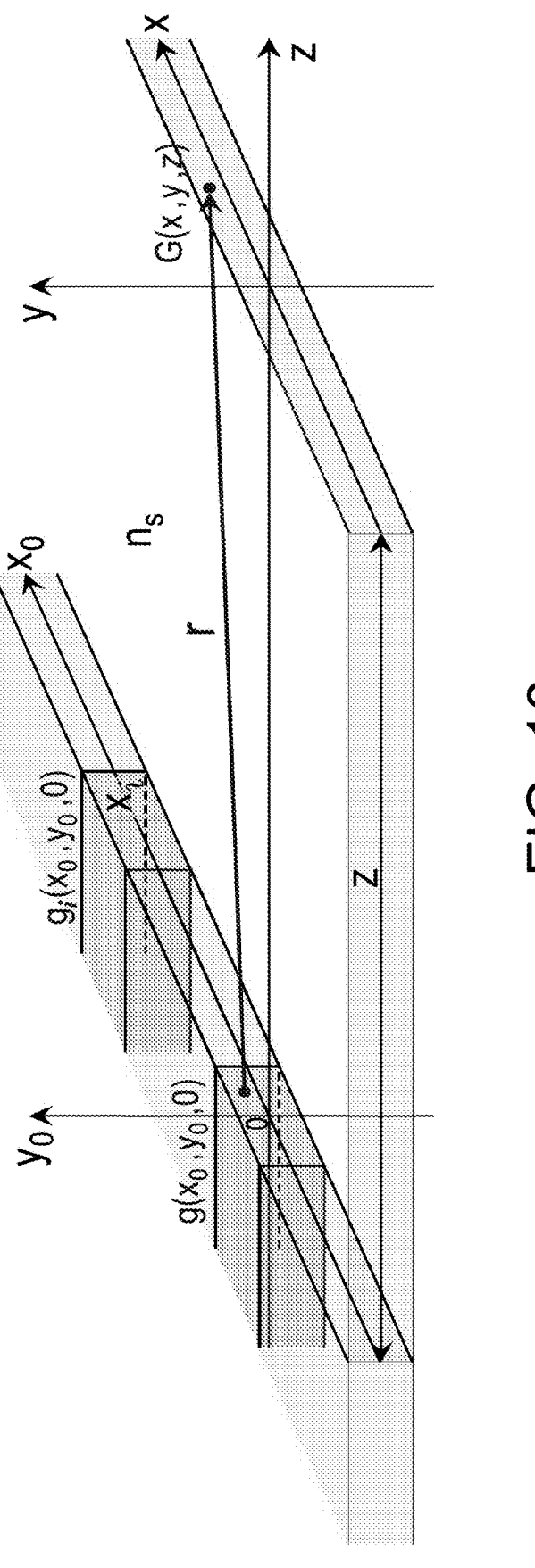
FIGS. 10 through 27K are graphs showing calculations, results, and assumptions relating to Fourier transform spectrometers using twin waveguide arrays.

Far-field radiation patterns from waveguide arrays are analytically obtained. FIG. 10 shows a coordinate system for the waveguide endface (z=0) and detection plane (z=z). Consider the coordinate system shown in FIG. 10 where the endface of the waveguide is located at z=0 and the electromagnetic field is radiated into the free space with refractive index $n_s$. The electric field at the endface of the waveguide is denoted by $g(x_o, y_o, 0)$ and the electric field distribution on the "detection plane" at distance z is expressed as G(x, y, z).

Figure 11:
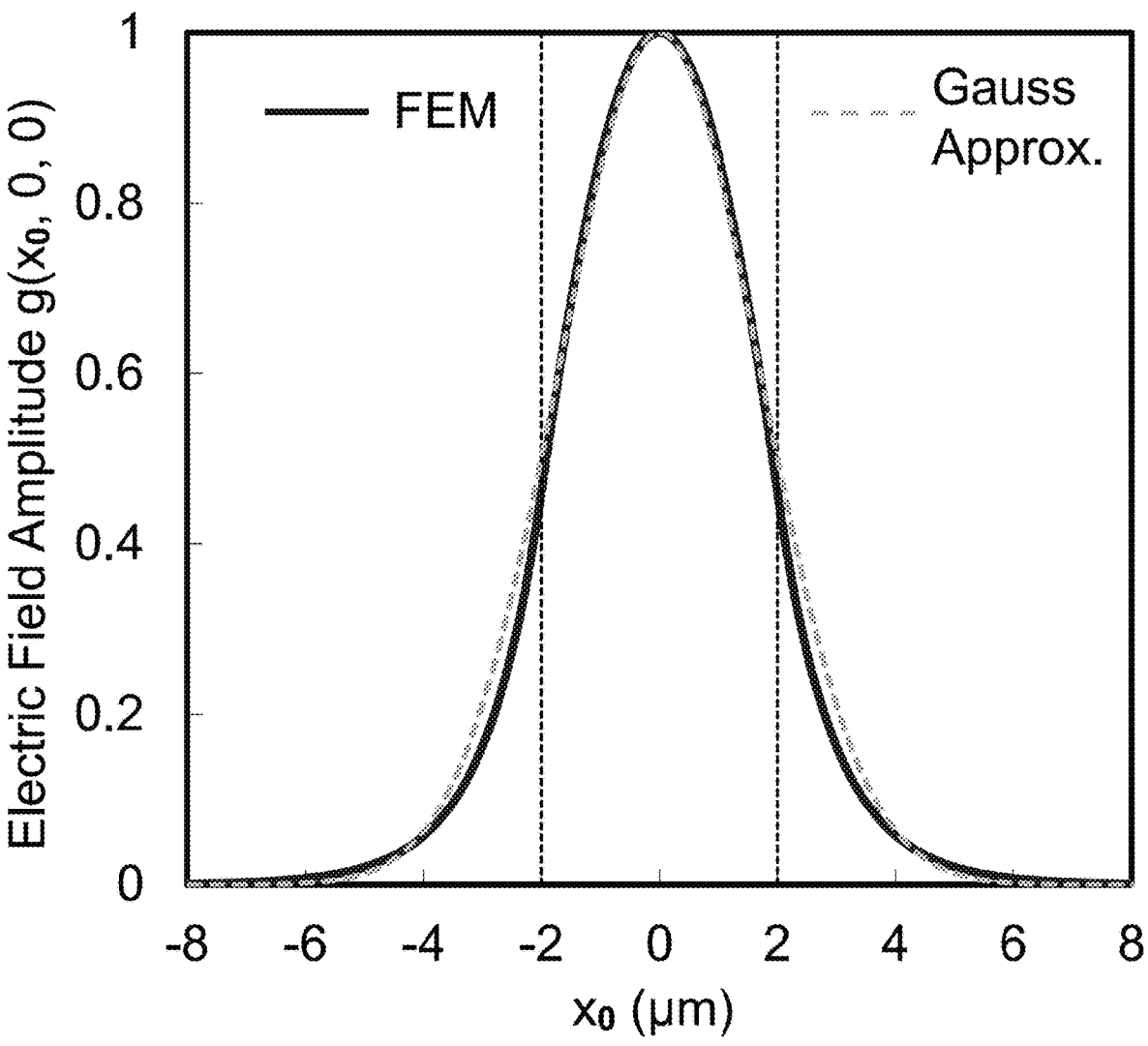

By the Fresnel-Kirchhoff diffraction formula, the radiation pattern G(x, y, z) is related to the endface field $g(x_o, y_o, 0)$ as $$G(x, y, z) = \frac{jkn_s}{2\pi} \int_{-\infty}^{\infty}\int_{-\infty}^{\infty} g(x_0, y_0, 0)\frac{1}{r}e^{-jkn_s r}dx_0 dy_0 \qquad (1)$$

where k is the free-space wavenumber $k=2\pi/\lambda$. Here, we approximate the waveguide mode $g(x_o, y_o, 0)$ by a Gaussian profile so as to obtain the analytical expression for G(x, y, z). FIG. 11 is a graph showing an electric field profile calculated by FEM (finite element method) and approximated field by a Gaussian profile for the channel waveguide having core size $2ax2t=4\times4~\mu m^2$, refractive-index difference $\Delta=2.0\%$, and wavelength of light $\lambda=1.55~\mu m$, respectively. FIG. 11 is an electric field profile calculated by FEM (finite element method) and approximated field by a Gaussian profile. Waveguide parameters core size $2ax2t=4.0\times4.0~\mu m^2$, refractive-index difference $\Delta=2.0\%$, and wavelength of light $\lambda=1.55~\mu m$. It is known from FIG. 11 that Gaussian profile well approximates electric field distribution of the channel waveguides.

Gaussian profile for $g_i(x_o, y_o, 0)$ that is centered at $x=x_i$ (i=1~M) is expressed as $$g_i(x_0, y_0, 0) = A_i \exp\left[-\frac{(x_0 - x_i)^2}{w_x^2} - \frac{y_0^2}{w_y^2}\right], (i = 1 \sim M) \qquad (2)$$

where M is the number of waveguides, $A_i$ is the field amplitude, $w_x(=2.4~\mu m)$ and $w_y(=2.4~\mu m)$ are the spot size of the field (the position at which electric field $|g_i|$ becomes 1/e to the peak value) along $x_o$- and $y_o$-axis directions, respectively.

As shown in herein, using Equations (1) and (2), total farfield radiation pattern from the lefthand-side and righthand-side waveguide arrays (see FIG. 1), denoted by $F_1(x)$ and $F_2(x)$ with $\Omega$ the relative phase difference between them, can be obtained as (Equations 21-22 herein):

$$F_1(x) = U_1(x)e^{-jkn_s \times sin(\theta/2)},$$
$$F_2(x) = U_2(x)e^{j[kn_s \times sin(\theta/2) \cdot \Omega]}$$

Figure 17:
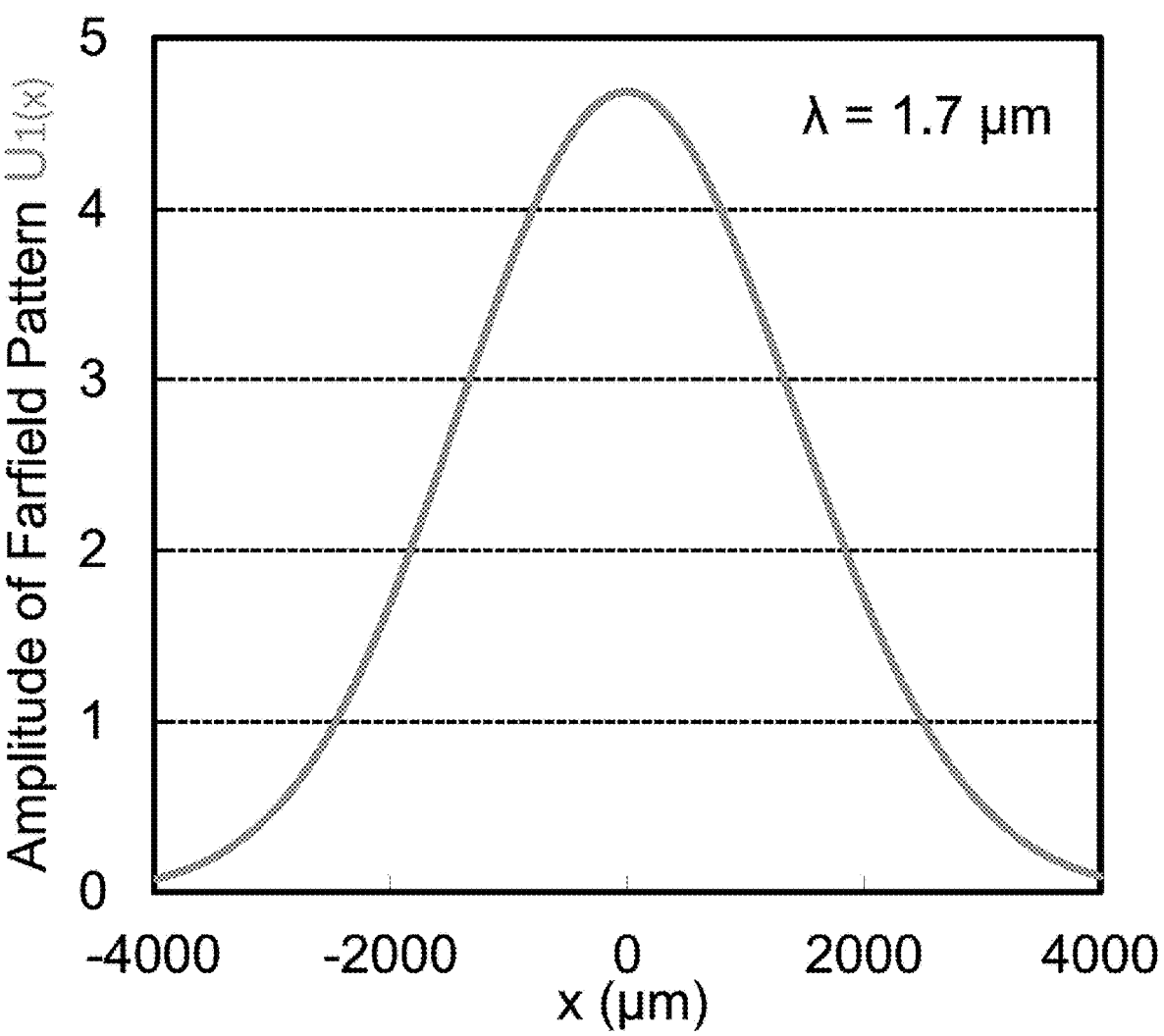
Figure 18:
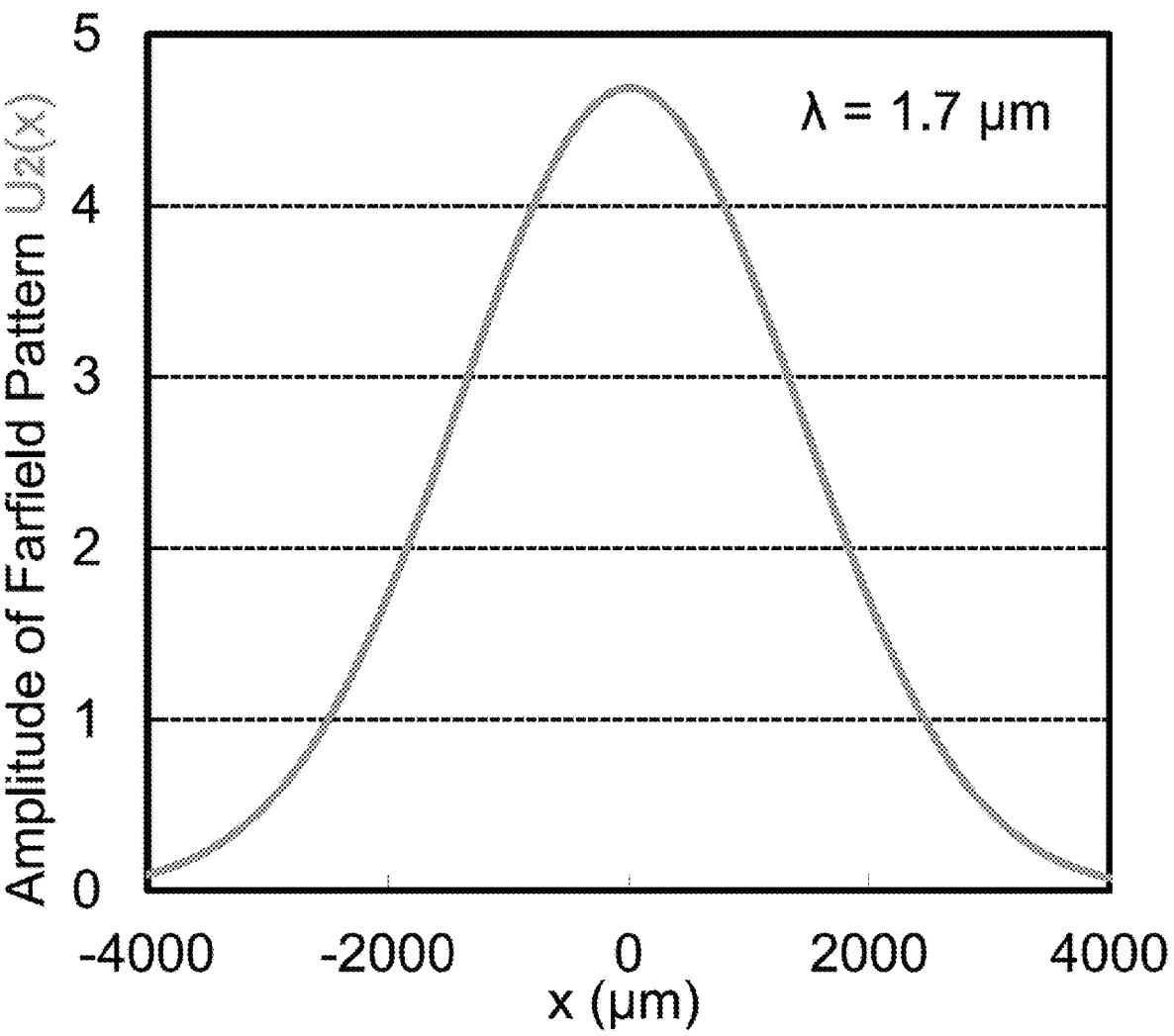

$U_1(x)$ and $U_2(x)$ are given by Equations (23) and (24) herein and shown in FIGS. 17 and 18. FIGS. 17 and 18 are graphs showing total fairfield radiation pattern from the lefthand-side and righthand-side waveguide arrays of FIG. 1.

The interferogram made by $F_1(x)$ and $F_2(x)$ is then given by:

$$I(x) = [F_1(x) + F_2(x)][F_1(x) + F_2(x)]^* =$$
$$U_1(x)^2 + U_2(x)^2 + 2U_1(x)U_2(x)\cos\left[2kn_s \times sin(\theta/2) - \Omega\right] =$$
$$U_1(x)^2 + U_2(x)^2 + 2U_1(x)U_2(x)\cos(2\pi\rho x),$$

$$\Lambda = \frac{\lambda}{2n_s sin(\theta/2)}, \rho = \frac{2n_s sin(\theta/2)}{\lambda} = \frac{1}{\Lambda}$$

and $f(x)=2U_1(x)U_2(x)$ where $\Lambda$ and $\rho$ denote "period" and "spatial frequency" of the interferogram.

Figures 15, 16:
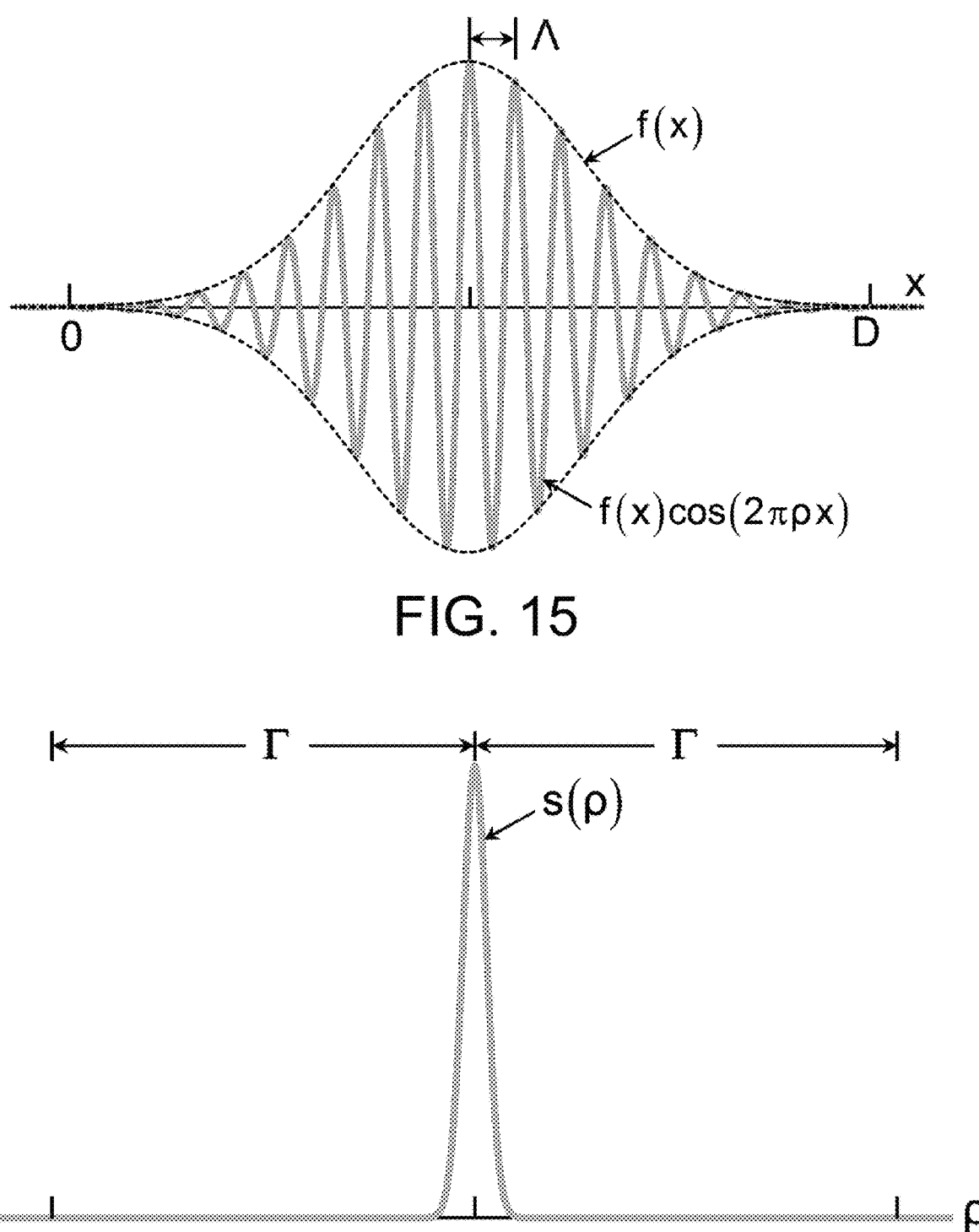

The cosine term in the interferogram is shown FIGS. 15 and 16. FIG. 15 is a graph showing interferogram cosine term denoted by p(x) with D as optical path length difference and FIG. 16 is a graph showing the Spatial Frequency Spectrum $\psi(p)$.

The DC offset of the interferogram is advantageously calculated using a "smoothing algorithm" such as "least squares regression" analysis. Then proper "window function" (e.g., Hann window) should be multiplied to p(x) as described in detail herein. Fourier Transform (FFT) of the processed interferogram provides the spectrum of the signal (e.g., in the range 1.3 µm to 1.7 µm). Spectral lines in the $\lambda>1.7$ µm region induce aliasing caused by Cosine FFT.

It should be noted that multiplication of the window function may result in a distortion in the spectrum. To correct amplitude distortion of the spectrum, the peak amplitude is curve fitted by a (second order) polynomial (see detailed description following). A remaining DC offset may still cause spectral broadening. More rigorous polynomial expression for the DC offset should eliminate the broadening. IMSL subroutine RCURV (NOBS,)(DATA, YDATA, NDEG, B, SSPOLY, STAT) may be used. IMSL (International Mathematics and Statistics Library) is available in C, Python, Java, Fortran, etc.

Wavelength Resolution $\Delta\lambda$ and Resolving Power (R) of the spectrometer are given by:

$$\Delta\lambda = \frac{\lambda_c^2}{2n_s D \sin(\theta/2)},$$

$$R = \frac{\lambda_c}{\Delta\lambda} = \frac{2n_s D \sin(\theta/2)}{\lambda_c}$$

Analytical simulations are provided below detailing Fourier-transform spectroscopy innovations.

Substituting Eq. (1) into (2) and assuming the following Fraunhofer (farfield) condition $$z >> \frac{n_s}{\lambda}(d_x^2 + d_y^2)$$

is satisfied, where dx=2a and dy=2t, G(x, y, z) reduces to:

$$G_i(x, y, z) =$$

$$A_i \exp\left(-\frac{y_0^2}{w_y^2}\right) \sqrt{\frac{w_x}{W_x}} \exp\left\{-\frac{(x-x_i)^2}{W_x^2} - jkn_s z + j\frac{\pi}{4}\right\}. \quad (i = 1 \sim M)$$

(3)

In the above equation, Wx is given by:

$$W_x(z) = w_x \sqrt{1 + \left(\frac{\lambda z}{\pi n_s w_x^2}\right)^2} \cong \frac{\lambda z}{\pi n_s w_x}.$$

(4)

Figure 12:
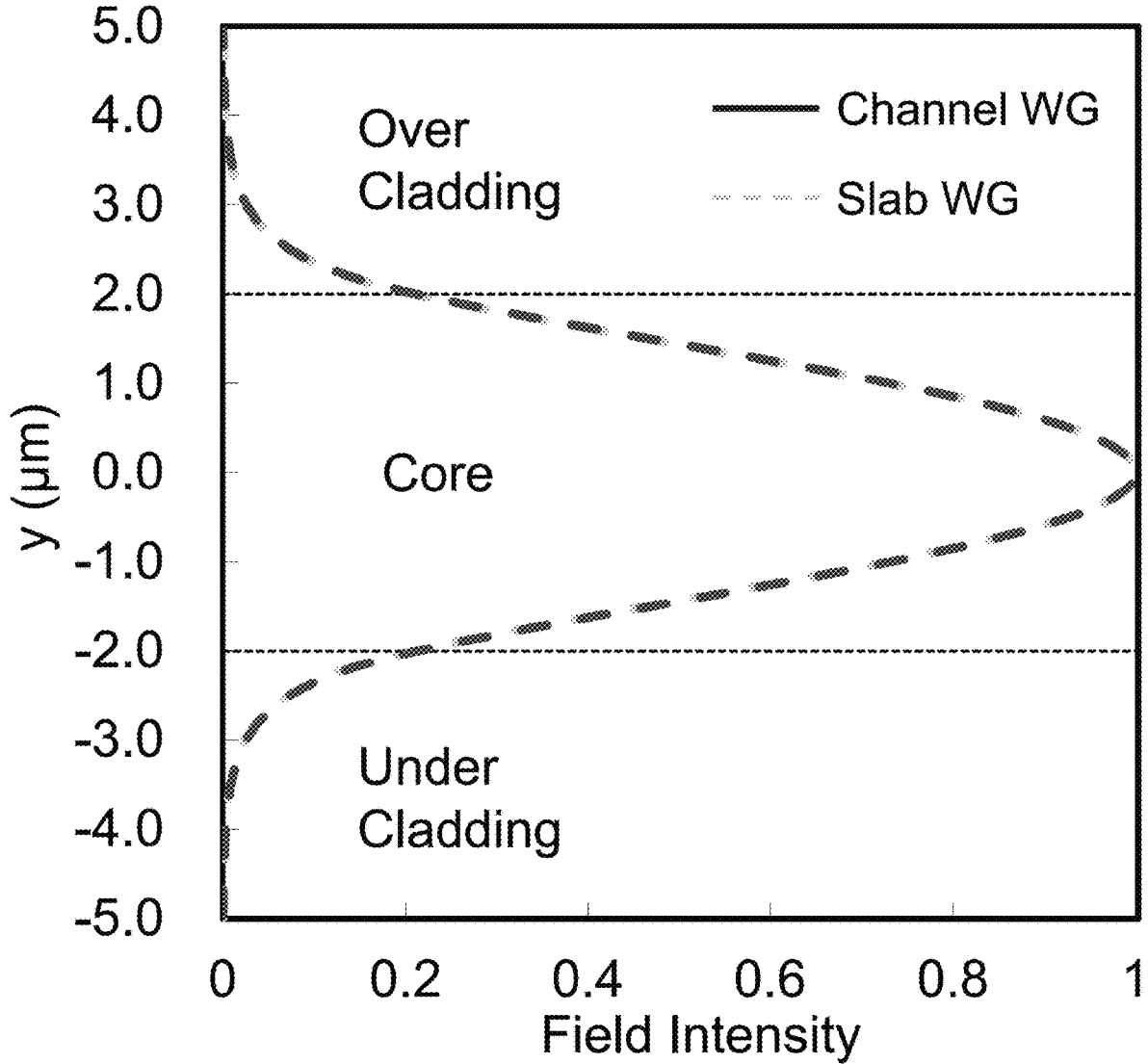

In the device configuration shown in FIG. 1, channel waveguide thickness and that in the slab region are equal. FIG. 12 is a graph showing field intensity distributions in the channel waveguide and in the slab waveguide along the y-axis direction. Core geometries are the same as those of FIG. 11. FIG. 12 shows field intensity distributions in the channel waveguide and in the slab waveguide along the y-axis direction. Two intensity profiles almost exactly match with each other. It is known then that the term $$\exp(-y_0^2/w_y^2)$$

in Eq. (3) can be omitted in the following analysis.

The farfield radiation pattern from the i-th channel waveguide is then expressed by:

$$G_i(x, z) = A_i \sqrt{\frac{w_x}{W_x(z)}} \exp\left\{-\left[\frac{(x-x_i)}{W_x(z)}\right]^2 - jkn_s z + j\frac{\pi}{4}\right\},$$

(5)

$$(i = 1 \sim M)$$

12

When the above $G_i$(x, z) in (x, z) coordinate is expressed by using inclined coordinate (x', z') which is centered at $(x_i, z_i)$, then:

$$\hat{G}_i(x', z') = A_i \sqrt{\frac{w_x}{W_x(z')}} \exp\left\{-\left[\frac{x'}{W_x(z')}\right]^2 - jkn_s z' + j\frac{\pi}{4}\right\},$$

Figure 13:
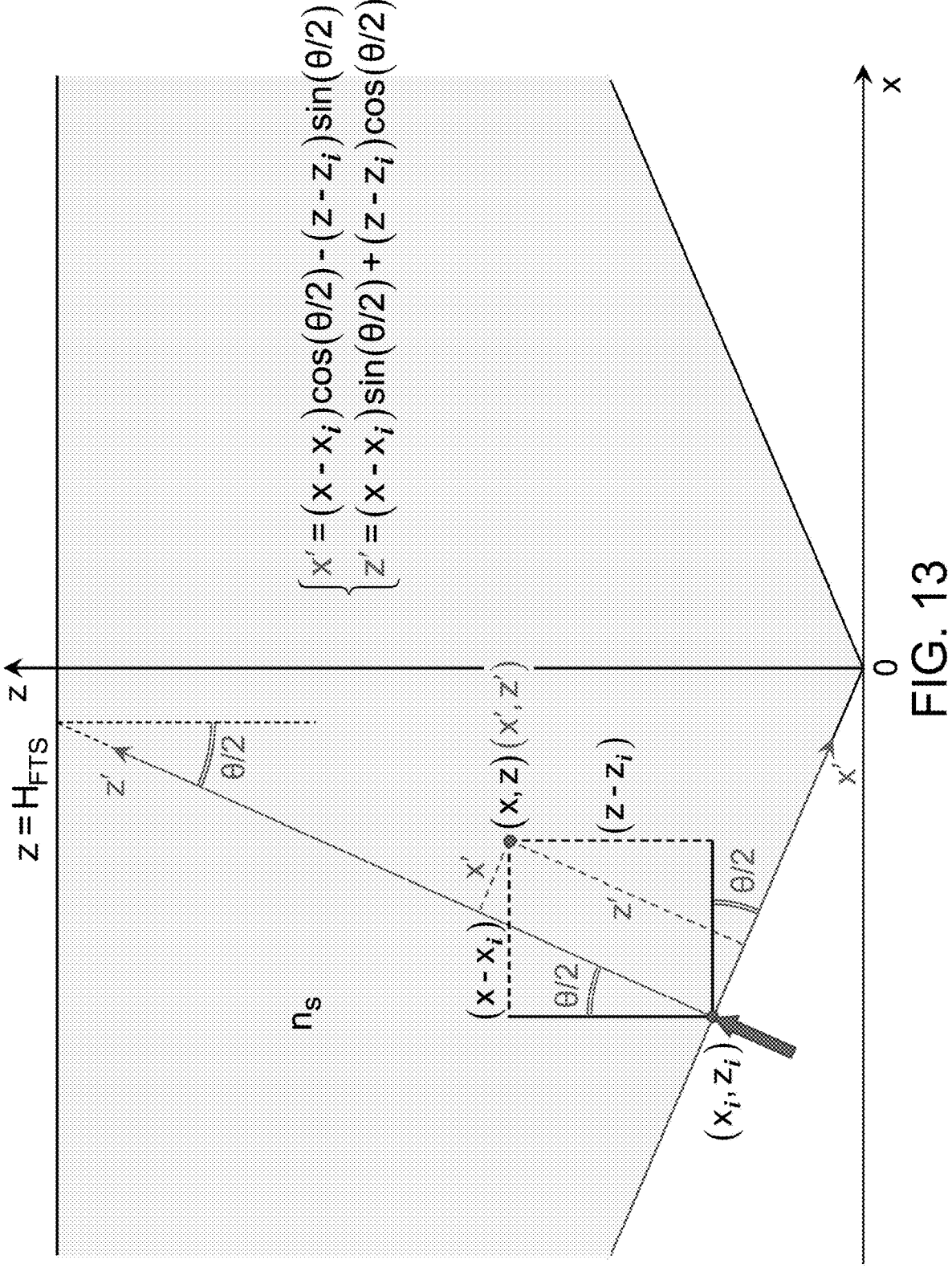

(6)

$$(i = 1 \sim M)$$

where, the inclination angle of the coordinate (x', z') with respect to the (x, z) coordinate is $\theta/2$ (half of the intersecting angle $\theta$) as shown in FIG. 13. FIG. 13 is a coordinate transformation between (x', z') and (x, z) in the lefthand-side waveguide array of FIG. 1. Coordinate transformation relation between (x', z') and (x, z) coordinates is given by:

$$\begin{cases} x' = (x - x_i)\cos(\theta/2) - (z - z_i)\sin(\theta/2) \\ z' = (x - x_i)\sin(\theta/2) + (z - z_i)\cos(\theta/2) \end{cases}.$$

(7)

Total farfield radiation pattern from the lefthand-side waveguide array is expressed as:

$$F_1(x) = \sum_{i=1}^{M} \hat{G}_i(x', z') = \sum_{i=1}^{M} A_i \sqrt{\frac{w_x}{W_x(z')}} \exp\left\{-\left[\frac{x'}{W_x(z')}\right]^2 - jkn_s z' + j\frac{\pi}{4}\right\},$$

(8)

Substituting Eq. (7) into (8), $F_1$(x) at the image plane z=$H_{Frs}$ is obtained as:

$$F_1(x) = \exp\left[-jkn_s \times \sin(\theta/2)\right]$$

(9)

$$\sum_{i=1}^{N} A_i \sqrt{\frac{w_x}{\omega_{1,i}(x)}} \exp\left\{-\left[\frac{(x - \Xi_{1,i})}{\omega_{1,i}(x)/\cos(\theta/2)}\right]^2\right\} \exp(-j\phi_{1,i}),$$

where $\phi_{1,i}$, $\Xi_{1,i}$, and $\omega_{1,i}(x)$ are given for $i = 1 \sim M$ by $$\begin{cases} \phi_{1,i} = kn_s\{-x_i\sin(\theta/2) + (H_{FTS} - z_i)\cos(\theta/2)\} - \frac{\pi}{4}, & (10a) \\ \Xi_{1,i} = x_i + (H_{FTS} - z_i)\tan(\theta/2), & (10b) \\ \omega_{1,i}(x) = \left(\frac{\lambda}{\pi n_s w_x}\right)[(x - x_i)\sin(\theta/2) + (H_{FTS} - z_i)\cos(\theta/2)]. & (10c) \end{cases}$$

Figure 14:
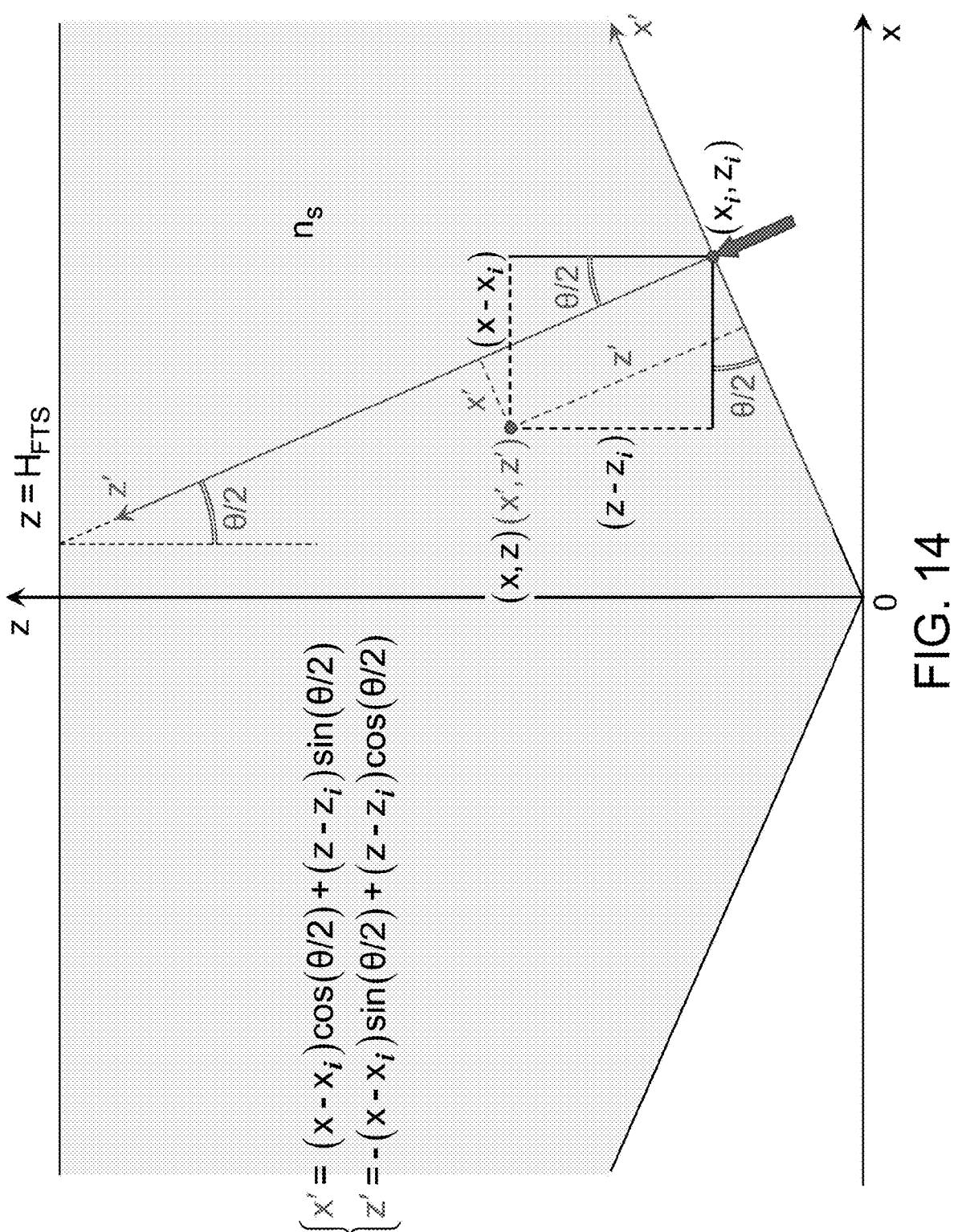

FIG. 14 is a coordinate transformation between (x', z') and (x, z) in the righthand-side waveguide array of FIG. 1. Referring to FIG. 14, a similar procedure to calculate the total farfield radiation pattern from the righthand-side waveguide array as:

$$F_2(x) = \exp\left[+jkn_s \times \sin(\theta/2)\right]$$

(11)

$$\sum_{i=1}^{N} A_i \sqrt{\frac{w_x}{\omega_{2,i}(x)}} \exp\left\{-\left[\frac{(x - \Xi_{2,i})}{\omega_{2,i}(x)/\cos(\theta/2)}\right]^2\right\} \exp(-j\phi_{2,i}),$$

where an amplitude distribution in the righthand-side waveguide array is assumed to be equal to $A_i$ and $\phi_{2,i}$, $\Xi_{2,i}$, and $\omega_{2,i}$ (x) for l=1~M are given by $$\begin{cases} \phi_{2,i} = kn_s\{x_i\sin(\theta/2) + H_{FTS} - z_i)\cos(\theta/2)\} - \dfrac{\pi}{4} & \text{(12a)} \\ \Xi_{2,i} = x_i - (H_{FTS} - z_i)\tan(\theta/2) & \text{(12b)} \\ \omega_{2,i}(x) = \left(\dfrac{\lambda}{\pi n_s w_x}\right)[-(x - x_i)\sin(\theta/2) + (H_{FTS} - z_i)\cos(\theta/2)]. & \text{(12c)} \end{cases}$$

Coordinate transformation relation for the righthand-side waveguide array is performed using:

$$\begin{cases} x' = (x - x_i)\cos(\theta/2) + (z - z_i)\sin(\theta/2) & \text{(13)} \\ z' = -(x - x_i)\sin(\theta/2) + (z - z_i)\cos(\theta/2). \end{cases}$$

Here we notice that the light input position $(x_i, z_i)$ in the lefthand-side waveguide array lies on the line $A\text{-}B_L$ (see FIGS. 1 and 13). Then, following equation is:

$$z = -(x - x_i)\tan(\theta/2) - z_i. \qquad (14)$$

Additionally, when put $x_i = z_i = 0$ is put into Eq. (15), then:

$$H_{FTS}\cos(\theta/2) = -X_{Lfi}\sin(\theta/2). \qquad (16)$$

Substituting Eqs. (15) and (16) into (10a), $\phi_{1,i}$ can be reduced to $$\phi_{1,i} = kn_s H_{FTS}\cos(\theta/2) - \frac{\pi}{4} \equiv \Phi. \qquad (17)$$

It is known that $\phi_{1,i}$ $(=\Phi)$ is independent of the light input position $(x_i, z_i)$ in the lefthand-side waveguide array.

Following a similar procedure, it is shown that $\phi_{2,i}$ is also expressed by $$\phi_{2,i} = kn_s H_{FTS}\cos(\theta/2) - \frac{\pi}{4} \equiv \Phi. \qquad (18)$$

Radiation field patterns $F_1(x)$ and $F_2(x)$ are now rewritten from Eqs. (9) and (11) to $$F_1(x) = e^{-jkn_s \times sin(\theta/2)}e^{-j\Phi}\sum_{i=1}^{M}A_i\sqrt{\frac{w_x}{\omega_{1,i}(x)}}\exp\left\{-\left[\frac{(x - \Xi_{1,i})}{\omega_{1,i}(x)/\cos(\theta/2)}\right]^2\right\}, \qquad (19)$$

$$F_2(x) = e^{j[kn_s \times sin(\theta/2)-\Omega]}e^{-j\Phi}\sum_{i=1}^{M}A_i\sqrt{\frac{w_x}{\omega_{2,i}(x)}}\exp\left\{-\left[\frac{(x - \Xi_{2,i})}{\omega_{2,i}(x)/\cos(\theta/2)}\right]^2\right\}, \qquad (20)$$

where an excess phase retardation term—$\Omega$ has been added to $F_2(x)$ so as to deal with influence of the relative phase difference between $F_1(x)$ and $F_2(x)$. In the following treatment of $F_1(x)$ and $F_2(x)$, identical constant phase term $\exp(-j\Phi)$ will be omitted for simplification purpose.

$F_1(x)$ and $F_2(x)$ are further rewritten to $$F_1(x) = U_1(x)e^{-jkn_s \times sin(\theta/2)}, \qquad (21)$$

$$F_2(x) = U_2(x)e^{j[kn_s \times sin(\theta/2)\cdot\Omega]}, \qquad (22)$$

where $U_1(x)$ and $U_2(x)$ are denoted by $$U_1(x) = \sum_{i=1}^{M}A_i\sqrt{\frac{w_x}{\omega_{1,i}(x)}}\exp\left\{-\left[\frac{(x - \Xi_{1,i})}{\omega_{1,i}(x)/\cos(\theta/2)}\right]^2\right\}, \qquad (23)$$

$$U_2(x) = \sum_{i=1}^{M}A_i\sqrt{\frac{w_x}{\omega_{2,i}(x)}}\exp\left\{-\left[\frac{(x - \Xi_{2,i})}{\omega_{2,i}(x)/\cos(\theta/2)}\right]^2\right\}. \qquad (24)$$

An interferogram made by $F_1(x)$ and $F_2(x)$ is given by $$\begin{aligned} I(x) &= [F_1(x) + F_2(x)][F_1(x) + F_2(x)]^* \qquad (25)\\ &= |U_1(x)|^2 + |U_2(x)|^2 + \\ &\quad U_1(x)U_2(x)e^{-j[2kn_s \times sin(\theta/2)-\Omega]} + \\ &\quad U_1(x)U_2(x)e^{j[2kn_s \times sin(\theta/2)-\Omega]} \\ &= U_1(x)^2 + U_2(x)^2 + \\ &\quad 2U_1(x)U_2(x)\cos[2kn_s \times \sin(\theta/2) - \Omega]. \end{aligned}$$

Example of cosine term $2U_1(x)U_2(x)\cos(2\pi px)$ in the interferogram is shown in FIG. 15. Rewriting Eq.(25), sinusoidal component $p(x)$ in the interferogram Is extracted as $$p(x) = \frac{I(x) - [U_1(x)^2 + U_2(x)^2]}{2U_1(x)U_2(x)} = \cos\left[2\pi\frac{2n_s\sin(\theta/2)}{\lambda}x - \Omega\right], \qquad (26)$$

where $k = 2\pi/\lambda$ has been used. $p(x)$ is obtained by the measurement of $U_1(x)$, $U_2(x)$. and $I(x)$. For example, the measurement of $U_1$ $(U_2)$ is done by blocking the light path from the Input to the righthand-side (lefthand-side) waveguide array.

Here new parameters $\Delta$ and $\rho$ are introduced; they are.

$$\Lambda = \frac{\lambda}{2n_s\sin(\theta/2)}, \qquad (27)$$

$$\rho = \frac{2n_s\sin(\theta/2)}{\lambda} = \frac{1}{\Lambda}, \qquad (28)$$

where $\Lambda$ and $\rho$ denote period and spatial frequency of the interferogram, respectively. $p(x)$ in Eq. (26) is then rewritten into $$p(x) = \cos(2\pi\rho - \Omega), \qquad (29)$$

When spectrum of the light source $s(p)$ is defined between Pmin and Pmax as shown in FIG. 16, we have the following expression:

$$P(x) = \int_{\rho_{min}}^{\rho_{max}} s(\rho)\cos(2\pi\rho x)d\rho, \tag{30}$$

where excess phase retardation term is set to $\Omega=0$.
When $\Omega$ is set to $\pi/2$, we have different sinusoidal component $q(x)$ from Eq. (26).

$$q(x) = \frac{I(x) - [U_1(x)^2 + U_2(x)^2]}{2U_1(x)U_2(x)} = \tag{31}$$
$$\cos\left[2\pi\frac{2n_s\times\sin(\theta/2)}{\lambda} - \frac{\pi}{2}\right] = \sin\left[2\pi\frac{2n_s\times\sin(\theta/2)}{\lambda}\right].$$

An equivalent expression to Eq. (30) for $\Omega=\pi/2$ is obtained as $$Q(x) = \int_{\rho_{min}}^{\rho_{max}} s(\rho)\sin(2\pi\rho x)d\rho, \tag{32}$$

Excess phase retardation $\Omega=\pi/2$ is achieved, for example, by elongating either one of the array waveguide length by $\Delta L=\lambda_0/(4n_c)$.
We then have a complex relation between $P(x)+jQ(x)$ and the spectrum of light source $s(\rho)$ as $$\psi(x) = P(x) + jQ(x) = \tag{33}$$
$$\int_{\rho_{min}}^{\rho_{max}} s(\rho)[\cos(2\pi\rho x) + j\sin(2\pi\rho x)]d\rho = \int_{\rho_{min}}^{\rho_{max}} s(\rho)e^{j2\pi\rho x}d\rho.$$

Spectrum $s(\rho)$ to be found out is given by $$s(\rho) = \int_0^D \Psi(x)\exp(-j2\pi\rho x)dx, \tag{34}$$

where $x=0\sim D$ is a measurement span of the interferogram which is realigned from the original definition $x=-D/2\sim D/2$ in FIG. 2.

The forward and inverse discrete Fourier transforms (DFT and IDFT). which are counterparts of the continuous forward and inverse Fourier transforms (Eq. (34) and Eq. (33)), are expressed [9] by $$s_\ell = DFT(\psi_n) = \frac{D}{N}\sum_{n=0}^{N-1}\psi_n\exp\left(-j2\pi\frac{n\ell}{N}\right), \quad (\ell = 0 \sim N-1) \tag{35}$$

$$\psi_n = IDFT(s_\ell) = \frac{2\Gamma}{N}\sum_{\ell=0}^{N-1}s_\ell\exp\left(j2\pi\frac{n\ell}{N}\right), \quad (n = 0 \sim N-1) \tag{36}$$

where N is a number of sampling points, and $\psi_n$ and $s_\ell$ are denoted by $$\psi_n = \psi(n\Delta x), \quad (n = 0 \sim N-1) \tag{37}$$

$$s_\ell = s(\ell\Delta\rho). \quad (\ell = 0 \sim N-1) \tag{38}$$

Based on the Nyquist-Shannon sampling theorem, we have following relations as $$N = 2\Gamma D, \tag{39}$$

$$\Delta x = \frac{1}{2\Gamma} = \frac{D}{N}, \tag{40}$$

$$\Delta\rho = \frac{1}{D} = \frac{2\Gamma}{N}. \tag{41}$$

Sampling theorem tells us that sampling interval $\Delta x$ should not exceed half of the period A of the interferogram; that is, $$\Delta x \le \frac{D}{N} = \frac{\Lambda}{2}. \tag{42}$$

Substituting Eq. (40) into (27). the maximum sampling period Sp ($=\Delta x$) is given by $$S_D = \frac{\lambda}{4n_s\sin(\theta/2)}. \tag{43}$$

Wavelength resolution $\Delta\lambda$ and resolving power of the spectrometer are obtained by using Eqs. (28) and (41) as $$\Delta\lambda = \frac{\lambda_c^2}{2n_sD\sin(\theta/2)}, \tag{44}$$

$$R = \frac{\lambda_c}{\Delta\lambda} = \frac{2n_sD\sin(\theta/2)}{\lambda_c}. \tag{45}$$

Where $\lambda_c$ corresponds to $\rho_c$ in FIG. 16.
In the derivation of $\Delta\lambda$, wavelength dependency of $n_s(\lambda)$ was ignored. Then, it should be noted that accuracy of $\Delta\lambda$ and R by Eqs. (44) and (45) becomes worth when signal spectrum $s(\lambda)$ is wide.
It is understood that spectral resolution $\Delta\lambda$ (resolving power R) becomes small (large) in proportion to the width D of the interferogram.
When the maximum wavelength $\lambda_{max}=\lambda_0$ is fixed, the minimum wavelength $\lambda_{min}$ can be obtained by noticing $\rho_{max}-\rho_{min}=2\tau$ and using Eqs. (28) and (40) as $$\lambda_{min} = \frac{1}{\dfrac{1}{2n_sS_D\sin(\theta/2)} + \dfrac{1}{\lambda_{max}}}, \tag{46}$$

where we used the relation $$\Gamma = \frac{1}{2S_D}. \tag{47}$$

It should be noted that the wavelength dependency of $n_s(\lambda)$ was ignored again.
4,1 FTS based on Cosine FFT
We first investigate FT spectrometer using only cosine or sine term in Eq. (33). It is confirmed that signal spectrum s(p) is identical either by using cosine FFT or sine FFT. Then, results using cosine FFT will be described.

When we assume $\psi(x)$ in Eq. (34) to be an even function ($\psi(-x)=\psi(x)$), the Cosine Fourier transform is obtained as $$\frac{1}{2}s(\rho) = \int_0^D \Psi(x)\cos(2\pi\rho x)dx. \qquad (48)$$

It is known that the measured signal spectrum by using Cosine FT becomes half of the original value $s(\rho)$.
Discrete Cosine FT is carried out by zeroing out the imaginary part ($jQ(x)$) in Eq. (35).
Table 1 shows parameters used in the numerical simulations. Sampling period with $S_D$=5.0 μm is adopted here because 2D InGaAs image sensors having 1296×1032 pixels are commercially available (12). Broad spectral range of 0.4~1.7 μm is covered a single sensor.
Intersecting angle $\theta$ is determined by using Eq. (43).

FIG. 17 is a graph showing amplitude of farfield pattern $U_1(x)$ from the lefthand-side waveguide array at $\lambda$=1.7 μm. FIG. 18 is a graph showing amplitude of farfield pattern $U_2(x)$ from the lefthand-side waveguide array at $\lambda$=1.7 μm.
FIGS. 17 and 18 show amplitude of farfield pattern:

> $U_1(X)$ ($=|F_1(x)|$) and $U_2(x)$ ($=|F_2(x)|$) from the lefthand-side and righthand-side waveguide arrays, respectively. Maximum difference between $U_1(x)$ and $U_2(x)$ is less than 0.05 in the entire area. It is then confirmed that $U_1(x)$ $U_2(x)$ for small $\theta$ value is almost the same. Interferogram created by $F_1(x)$ and $F_2(x)$ over $\lambda$=1.3 μm to 1.7 μm with excess phase retardation $\Omega$=0 is shown in FIG. 12. Wavelength step of the spectrum is 0.025 μm. It is known that net value of image plane length $D_{net}$, where pixel should cover, is about 8000 μm. Then, net number of pixels is determined to be $N_{net}$~1600.

TABLE 1

| Parameters used in simulation. | |
| --- | --- |
| $\lambda_0$ (μm) | 1.70 |
| $n_s$ | 1.46362 |
| Sampling Period $S_D$: (μm) | 5.0 |
| $\theta$ (deg) | 6.66 |
| $\wedge$ (μm) | 10.0 |
| Number of Array WGs: M | 256 |
| $H_{FTS}$ (μm) | 14105.8 |
| D (μm) | 20480.0 |
| N ($=D/S_D$) | 4096 |
| ↓ | ↓ |
| $D_{eff}$ (μm) | 8000.0 |
| $N_{eff}(=D_{eff}/S_D)$ | 1600 |

Figure 19:
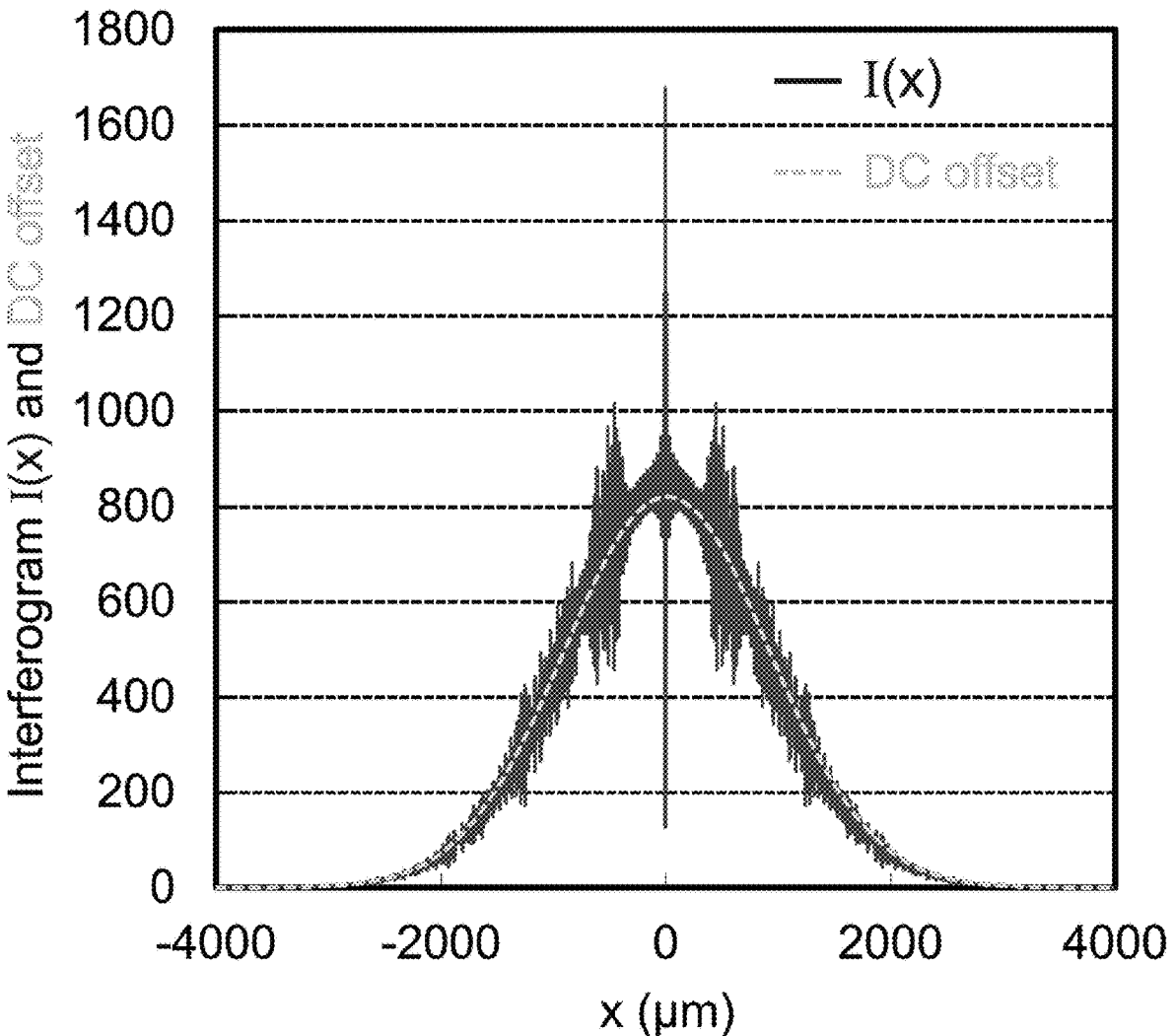
Figure 20:
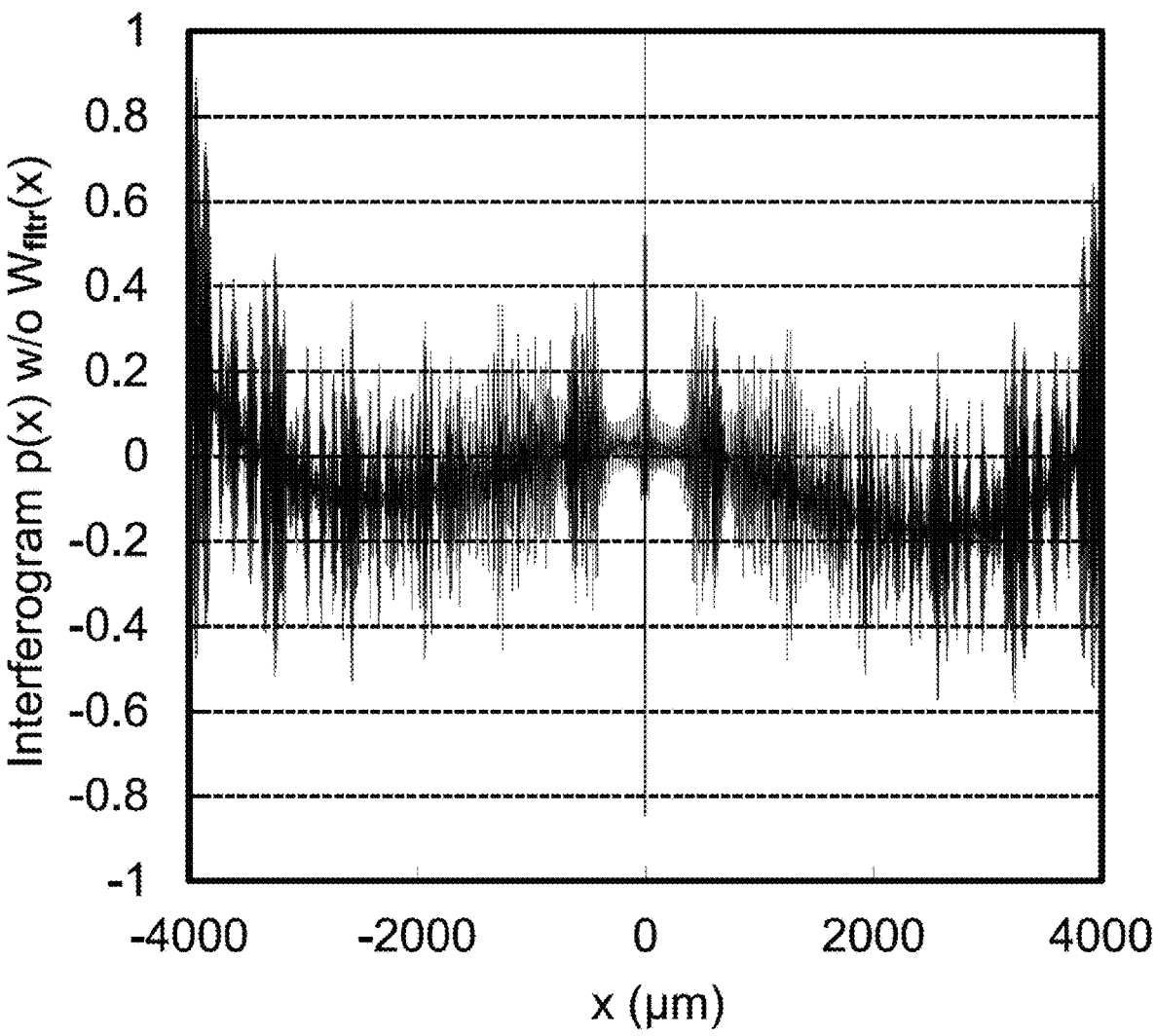
Figure 21:
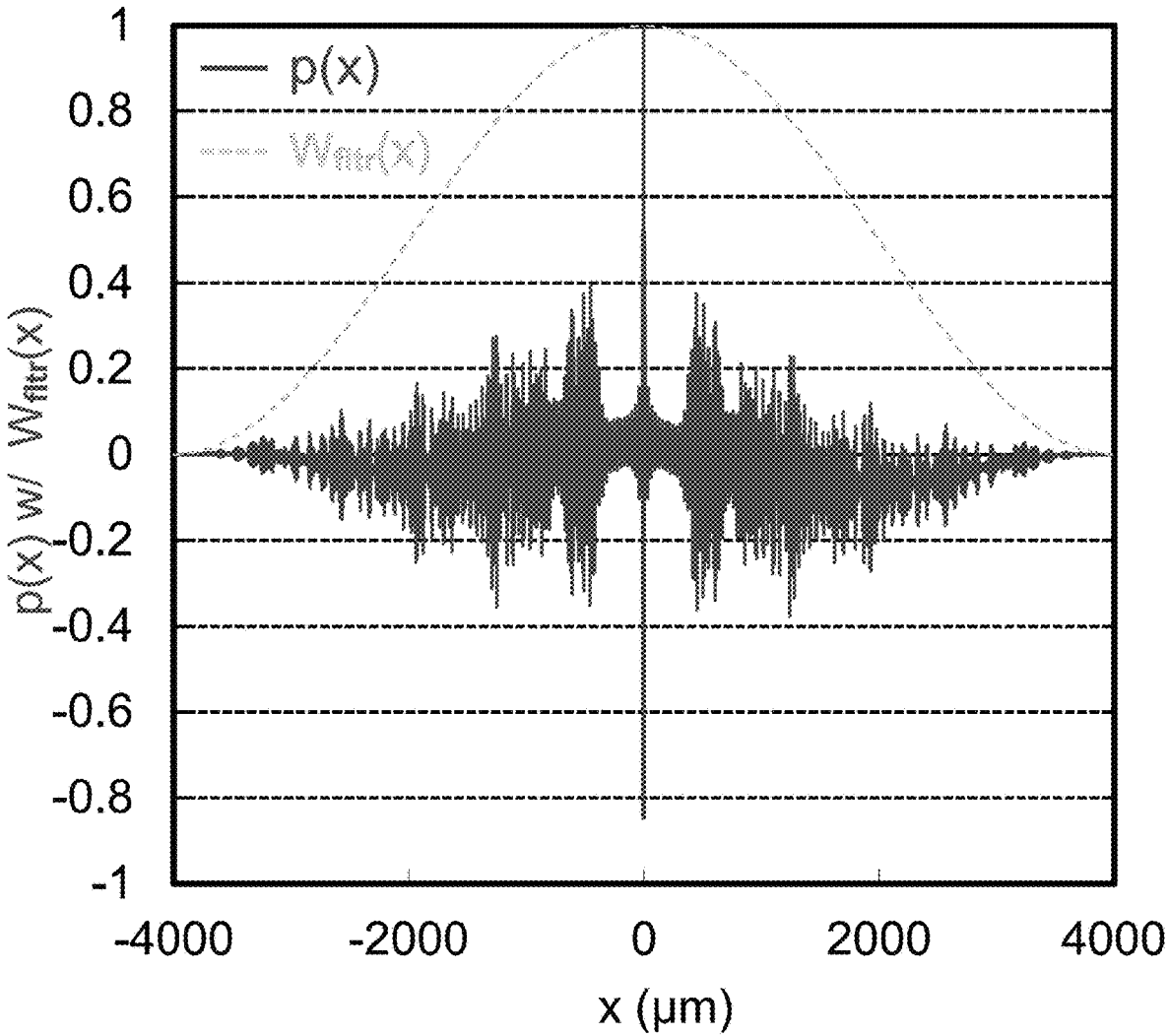

FIG. 19 is a graph showing:
Interferogram I(x) ($\Omega$=0) created by 17 $\lambda$'s having equal amplitude ranging from $\lambda$=1.3 μm to 1.7 μm with the step of 0.025 μm. Dotted line is a DC offset that should be removed from the interferogram I(x).
FIG. 20 is a graph showing interferogram p(x) after removing the DC offset.
FIG. 21 is a graph showing:
Hann window function $W_{fltr}(x)$ and interferogram $p(x)(\Omega=0)$ with $W_{fltr}(x)$ multiplication.

Figure 22:
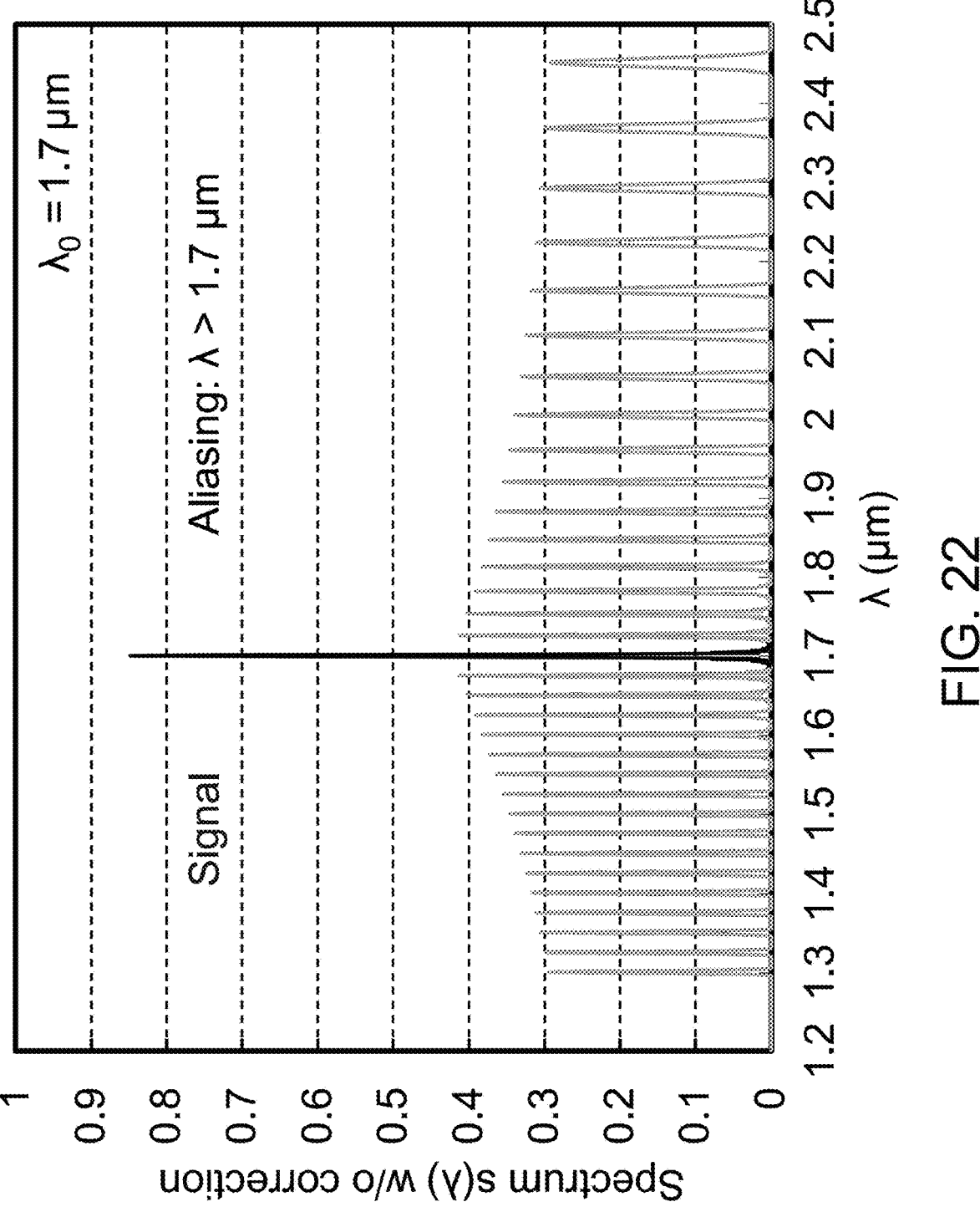
Figure 23:
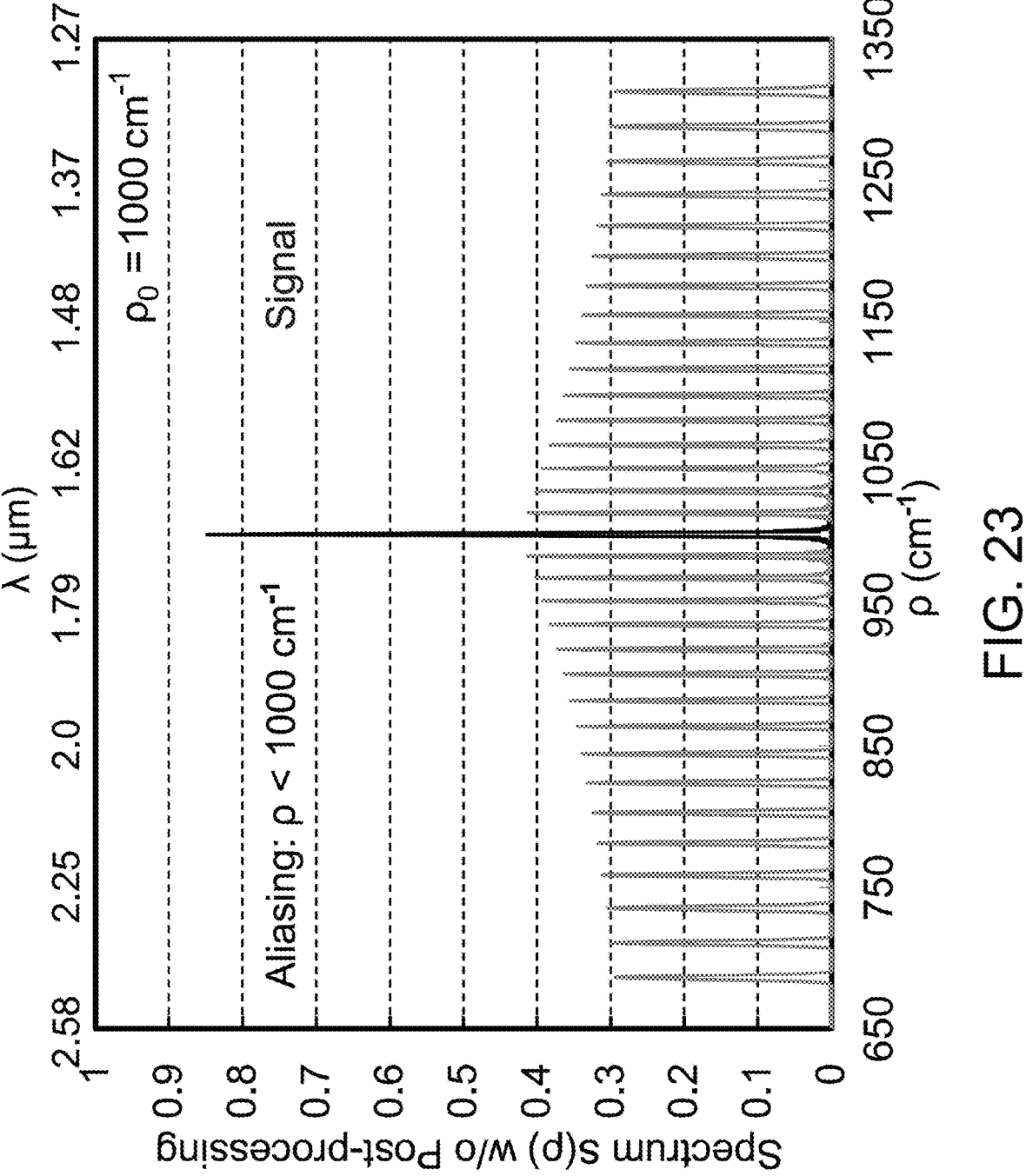
Figure 24:
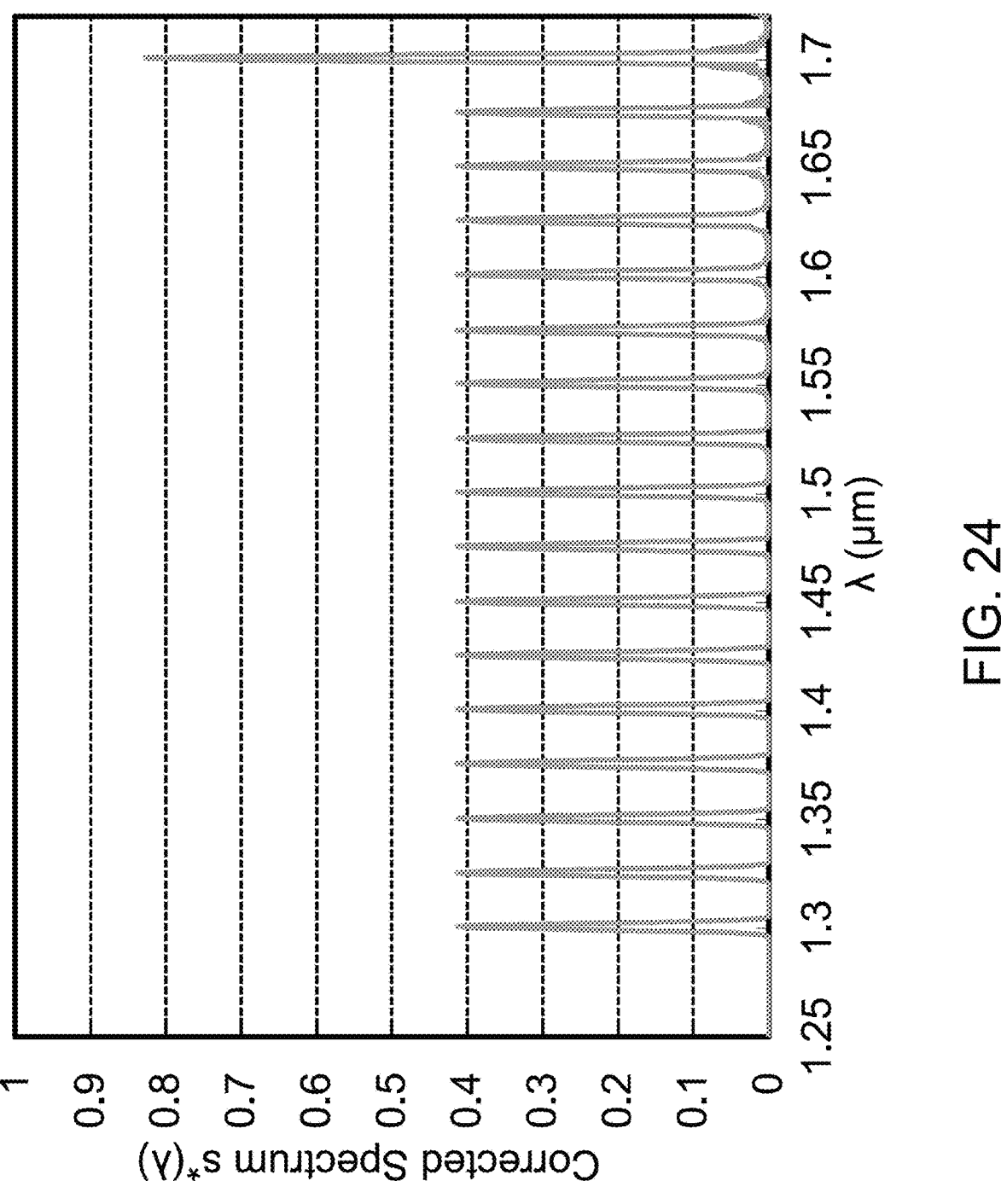
Figure 25:
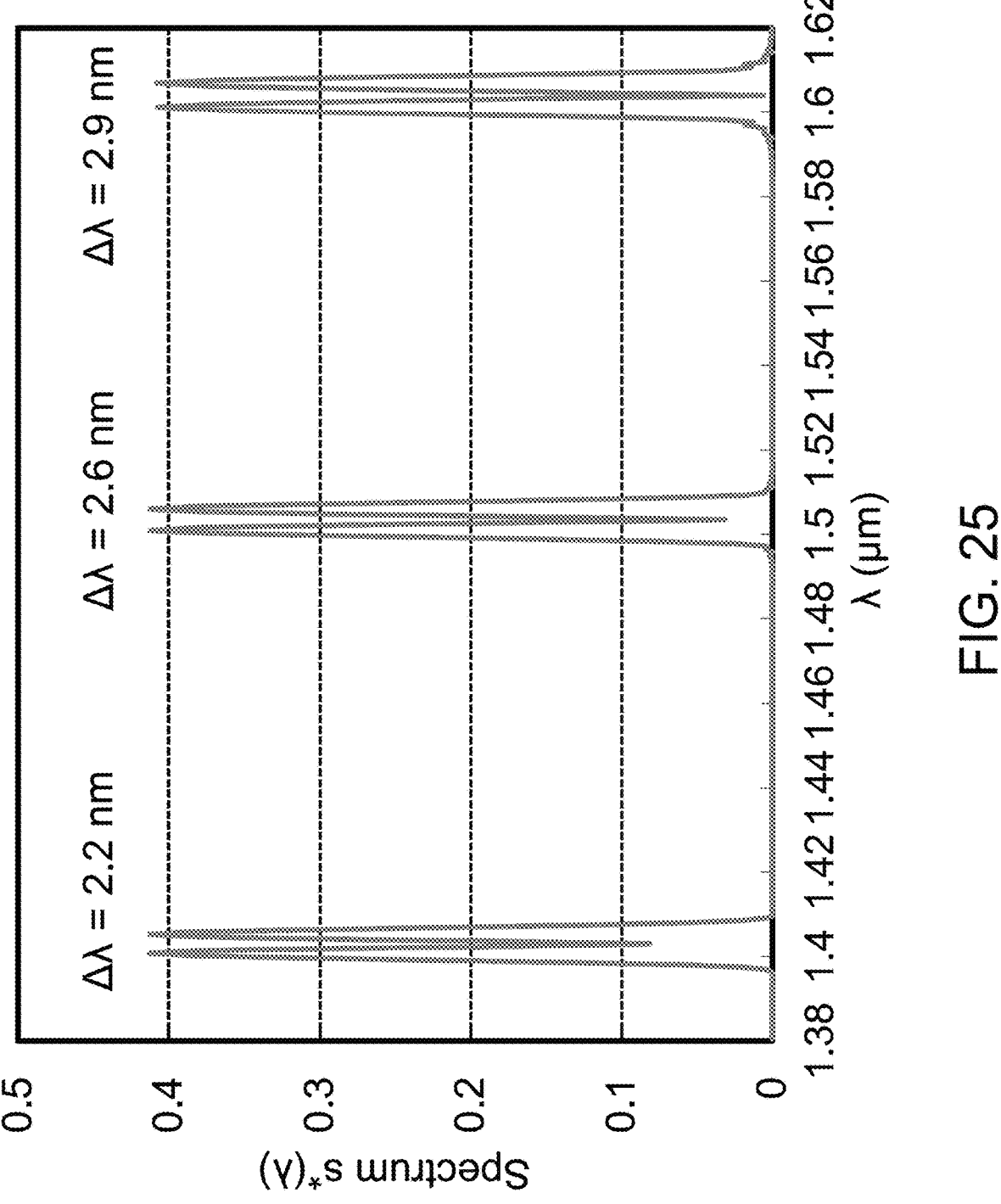

In FIG. 19:
interferogram I(x) ($\Omega$=0) was created by 17 wavelengths having equal amplitude.
Wavelength of 17 spectral lines are $\lambda_i$=1.70-0.025·i μm (i=1~16) and $\lambda_0$=1.70 μm. Dotted line is a DC-offset that should be removed as shown in Eq. (26). DC offset for an unknown signal spectrum s($\lambda$) cannot be obtained in advance either theoretically or experimentally. The DC offset should be calculated using the smoothing algorithm such as least squares regression analysis.
We assume here that the DC offset can be represented, to the zeroth order approximation, by $A_{mlt}*2*U_{av}^2(\lambda_{ofst}, x)$ where $A_{mlt}$ is a multiplication factor and $U_{av}^2(\lambda_{ofst}, x)$ denotes an average of $U_1(\lambda_{ofst}, x)$ and $U_2(\lambda_{ofst}, x)$ at the wavelength $\lambda_{ofst}$. $\lambda_{ofst}$=1.55 μm and $A_{mlt}$=17.2 were determined because they give the best results for spectral retrieval of s($\lambda$).
The interferogram p(x) after removing the DC offset is shown in in FIG. 20. Window function is not yet applied to p(x).
The underlying FFT mathematics assumes that the two endpoints of the interferogram (x=−D/2 and D/2) are interpreted as though they were connected together. i.e., the endpoints having the same value at each end of an interval. Then proper window function should be multiplied to p(x). Here Hann(ing) window function, which is defined by, $$W_{fltr}(x) = \frac{1}{2}\left[1 + \cos\left(2\pi\frac{x}{D_{eff}}\right)\right], \left(x = -\frac{D_{eff}}{2} \sim \frac{D_{eff}}{2}\right) \qquad (48)$$

is applied.
FIG. 21 shows the Hann window function $W_{fltr}(x)$ (dotted Line) and interferogram with $W_{fltr}(x)$ multiplication (solid line), respectively. FIG. 22 is a graph showing:
Detection of s($\lambda$) consisting of 17 line spectrum by using Cosine Fourier transform. Spectral lines in $\lambda$>1.7 μm region are aliasing.
Theoretical detection of s($\lambda$) consisting of 17 line spectrum has been carried out by using Cosine Fourier transform and results are shown in FIG. 22.
Spectral lines in $\lambda$>1.7 μm region are aliasing caused by Cosine FFT (see Eq. (48)).
FIG. 23 is a graph showing:
Signal s($\rho$) consisting of 17 line spectrum by using Cosine Fourier transform. Spectral lines in $\rho$<1000 cm$^{-1}$ region are aliasing.
Signal s(p) expressed in terms of spatial frequency p is shown in FIG. 23. Here spectral lines in p<1000 cm$^{-1}$ region are aliasing.
FIG. 24 is a graph showing:
Signal s*($\lambda$) consisting of 17 line spectrum after applying amplitude correction.
It should be noted that multiplication of the window function results in a distortion in the spectrum s($\lambda$) as shown in FIGS. 22 and 23. In order to correct amplitude distortion of s($\lambda$), the peak amplitude was curve fitted by a polynomial. Second-degree polynomial of the form $$F_p(\lambda) = 0.2969\lambda^2 - 0.5669\lambda + 0.5286$$

is found to be sufficient for fitting from $\lambda$=1.3 μm to just below $\lambda$=1.7 μm. Corrected signal s*($\lambda$) consisting of 17 line spectrum with equal amplitude is Shown in FIG. 24. Except the signal at $\lambda_0$=1.7 μm, amplitude of the signal has been corrected to equal amplitude.
FIG. 25 is a graph showing investigation of the resolution measuring doublet in three spectral regions. FIG. 25 shows results of investigation on the resolution measuring doublet in three spectral regions.

Table 2 summarizes spectral resolution $\Delta\lambda$, $\Delta v$ and resolving power R which are obtainable by the configuration in Table 1.

TABLE 2

| Spectral resolution $\Delta\lambda$ and $\Delta v$ by cosine FFT. | | | |
|---|---|---|---|
| $\lambda$ ($\mu$m) | $\Delta\lambda$ (nm) | $\Delta v$ (GHz) | $R = \lambda/\Delta\lambda$ |
| 1.70 | 3.24 | 337.54 | 524.4 |
| 1.60 | 2.90 | 337.74 | 552.6 |
| 1.50 | 2.55 | 337.88 | 589.4 |
| 1.40 | 2.22 | 338.07 | 631.3 |
| 1.30 | 1.91 | 338.10 | 680.0 |

Figure 26:
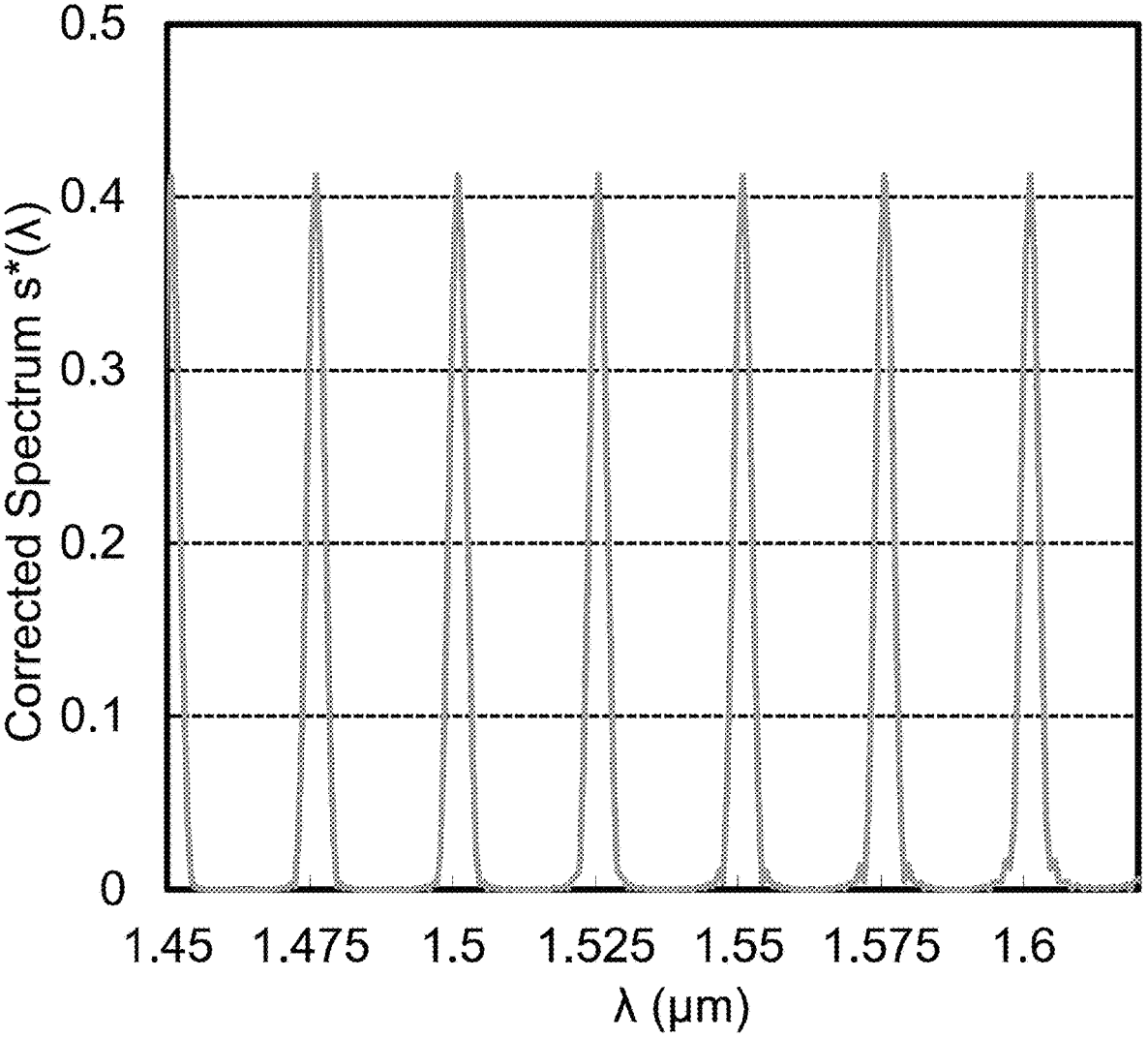

FIG. 26 is a graph showing:

Enlarged view of the signal s*($\lambda$) consisting of 17 spectral lines.

Theoretical resolution $\Delta\lambda$ and $\Delta v$ with $D_{eff}$=8000 $\mu$m and $N_{eff}$=1600 is shown in Table 3 (see Eq. (44)). Resolution obtained by the Cosine FFT is about 1.5 times worse than theoretical one. The reason for degradation of the resolution may be attributed to the non-optimized approximation curve for the DC offset (see FIG. 19). The remaining DC offset may have caused spectral broadening as shown in FIG. 26. More rigorous polynomial expression for the DC offset may be advantageously investigated.

TABLE 3

| Theoretical resolution $\Delta\lambda$ and $\Delta v$ of cosine FFT based on Eq. (44) with $D_{eff}$ = 8000 $\mu$m and $N_{eff}$ = 1600. | | | |
|---|---|---|---|
| $\lambda$ ($\mu$m) | $\Delta\lambda$ (nm) | $\Delta v$ (GHz) | $R = \lambda/\Delta\lambda$ |
| 1.70 | 2.12 | 220.0 | 801.9 |
| 1.60 | 1.88 | 220.0 | 851.1 |
| 1.50 | 1.65 | 220.1 | 909.1 |
| 1.40 | 1.44 | 220.1 | 972.2 |
| 1.30 | 1.24 | 220.2 | 1048.4 |

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A Fourier transform spectrometer implemented on a photonic integrated circuit (PIC), comprising:

an input optical signal waveguide carrying an input optical signal to be analyzed;

an on-chip Y branch splitter configured to split the input optical signal into first and second optical signals;

a first waveguide array configured to receive the first optical signal;

a second waveguide array configured to receive the second optical signal; wherein the first waveguide array and the second waveguide array terminate at an output plane of said PIC at a preset non-zero intersecting angle, such that optical fields output from said first and second waveguide arrays overlap in a slab waveguide region to generate a spatial interference fringe pattern forming an interferogram; and, said intersecting angle determining a spectral resolution and a spatial resolution of the interferogram.

2. The Fourier transform spectrometer of claim 1, wherein the optical signal from the first waveguide array and said optical signal from said second waveguide array intersect at a preset intersecting angle to generate interference of the two optical signals from the output of the two intersecting waveguide arrays resulting in an interferogram at the output plane of said PIC, said interferogram processed to obtain the spectrum by taking Fourier transform.

3. The Fourier transform spectrometer of claim 1, wherein said photonic integrated circuit (PIC) is a planar waveguide circuit (PLC).

4. The Fourier transform spectrometer of claim 1, further comprising a lower clad-mode region and an upper clad-mode region incorporated within said Y branch splitter to deflect undesirable radiated leakages.

5. The Fourier transform spectrometer of claim 1, further comprising a segmented taper region to efficiently couple the optical power from a slab region to array waveguides on each side.

6. The Fourier transform spectrometer of claim 1, wherein a DC offset of said interferogram is calculated using a smoothing algorithm such as least squares regression analysis.

7. The Fourier transform spectrometer of claim 1, further comprising an alignment waveguide for PIC packaging.

8. The Fourier transform spectrometer of claim 1, wherein said intersecting angle is between five to seven degrees.

9. The Fourier transform spectrometer of claim 1, further comprising a thermo-optic (TO) micro-heater at an input waveguide of one of said twin waveguide arrays and after said Y branch splitter to perform spectral interpolation to compute the spectrum without a magnifying lens.

10. The Fourier transform spectrometer of claim 1, further comprising a detector positioned to capture said interferogram at said output plane.

11. The Fourier transform spectrometer of claim 1, further comprising a camera detector array with a suitable pixel pitch for receiving output optical signals from the PIC output through an imaging magnifying lens.

12. The Fourier transform spectrometer of claim 1, further comprising multiple PICS, each having a transform spectrometer as recited in claim 1.

13. A Fourier transform spectrometer system comprising:

a photonic integrated circuit (PIC) comprising the Fourier transform spectrometer of claim 1;

a detector array optically coupled to the output plane of the PIC and configured to capture the interferogram; and one or more processors configured to apply a Fourier transform to the captured interferogram to determine a spectrum of the input optical signal.

14. The system of claim 13, wherein the one or more processors are further configured to estimate and remove a DC offset from the interferogram using a smoothing algorithm.

15. The system of claim 13, further comprising an imaging lens disposed between the output plane of the PIC and the detector array.

16. The system of claim 13, wherein the detector array comprises a camera detector array having a pixel pitch selected to sample the spatial interference fringe pattern.

17. An integrated spectrometer device comprising:

(a) a photonic integrated circuit (PIC) comprising:

(i) an input slab region and an output slab waveguide region;

(ii) first and second waveguide arrays that connect the input slab region to the output slab waveguide region;

(iii) wherein the first and second waveguide arrays terminate at the output slab waveguide region at a preset non-zero intersecting angle to launch optical fields into the output slab waveguide region to generate a spatial interference fringe pattern forming an interferogram; and (iv) a segmented taper region disposed between the input slab region and the first and second waveguide arrays, the segmented taper region configured to efficiently couple optical power from the input slab region to the first and second waveguide arrays; and (b) a detector array optically coupled to the output slab waveguide region and configured to capture the interferogram.

18. The device of claim 17, further comprising an alignment waveguide integrated on the PIC for packaging alignment, the alignment waveguide being optically decoupled from the first and second waveguide arrays.

19. The device of claim 17, further comprising a thermo-optic micro-heater disposed to apply a controllable phase shift to at least one of the split optical signals to perform spectral interpolation.

20. The device of claim 17, wherein the preset intersecting angle is between five degrees and seven degrees.

* * * * *